(12) United States Patent
Diosi et al.

(10) Patent No.: US 7,713,160 B2
(45) Date of Patent: *May 11, 2010

(54) MULTISTAGE AUTOMATIC TRANSMISSION WITH THREE PLANETARY GEAR SETS

(75) Inventors: Gabor Diosi, Friedrichshafen (DE); Josef Haupt, Tettnang (DE); Martin Brehmer, Constance (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 453 days.

This patent is subject to a terminal disclaimer.

(21) Appl. No.: 11/704,582

(22) Filed: Feb. 9, 2007

(65) Prior Publication Data

US 2008/0194374 A1    Aug. 14, 2008

(51) Int. Cl.
F16H 3/62 (2006.01)
(52) U.S. Cl. .................. 475/275; 475/278; 475/285
(58) Field of Classification Search ............... 475/275, 475/277, 278, 284, 285
See application file for complete search history.

(56) References Cited

U.S. PATENT DOCUMENTS

| 3,776,066 | A |   | 12/1973 | Piret |         |
|-----------|---|---|---------|-------|---------|
| 3,977,272 | A |   | 8/1976  | Neumann |       |
| 4,038,888 | A | * | 8/1977  | Murakami et al. | 475/276 |
| 4,070,927 | A |   | 1/1978  | Polak |         |
| 4,395,925 | A |   | 8/1983  | Gaus |          |
| 4,732,253 | A |   | 3/1988  | Hiramatsu et al. |  |
| 4,939,955 | A |   | 7/1990  | Sugano |        |
| 5,106,352 | A |   | 4/1992  | Lepelletier |   |
| 5,232,411 | A |   | 8/1993  | Hayashi et al. |  |
| 5,250,011 | A |   | 10/1993 | Pierce |        |
| 5,295,924 | A |   | 3/1994  | Beim |          |
| 5,308,295 | A |   | 5/1994  | Michioka et al. | |
| 5,435,792 | A |   | 7/1995  | Justice et al. | |
| 5,439,088 | A |   | 8/1995  | Michioka et al. | |
| 5,460,579 | A |   | 10/1995 | Kappel et al. |  |
| 5,520,588 | A |   | 5/1996  | Hall, III |     |
| 5,533,945 | A |   | 7/1996  | Martin et al. | |
| 5,536,220 | A |   | 7/1996  | Martin |        |
| 5,542,889 | A |   | 8/1996  | Pierce et al. | |
| 5,647,816 | A |   | 7/1997  | Michioka et al. | |
| 5,735,376 | A |   | 4/1998  | Moroto et al. | |
| 6,139,463 | A |   | 10/2000 | Kasuya et al. | |

(Continued)

FOREIGN PATENT DOCUMENTS

DE    26 19 895    11/1976

(Continued)

*Primary Examiner*—Ha D. Ho
(74) *Attorney, Agent, or Firm*—Davis & Bujold, P.L.L.C.

(57) ABSTRACT

A multi-stage automatic transmission possesses an input drive shaft (AN), an output drive shaft (AB), three single planetary gear sets (RS1, RS2, RS3) as well as five shifting elements (A to E), via the pairwise selective closure of which, an entry speed of rotation of the input drive shaft (AN) can be transmitted to the output drive shaft (AB) without group shifting. A sun gear (SO3) of the third planetary gear set (RS3) can be set motionless by the first shifting element (A) on the transmission housing (GG). The input drive shaft (AN) is bound to a sun gear (SO2) of the second planetary gear set (RS2) and via the second shifting element (B) can be connected with a sun gear (SO1) of the first planetary gear set (RS1) and via of the fifth shifting element (E) with a spider (ST1) of the first planetary gear set (RS1).

20 Claims, 14 Drawing Sheets

| Gear | Closed shifting elements ||||| 
|---|---|---|---|---|---|
|  | A | B | C | D | E |
| 1 | ● |   |   | ● |   |
| 2 | ● |   | ● |   |   |
| 3 | ● | ● |   |   |   |
| 4 | ● |   |   |   | ● |
| 5 |   | ● |   |   | ● |
| 6 |   |   | ● |   | ● |
| R |   | ● |   | ● |   |

U.S. PATENT DOCUMENTS

| | | | |
|---|---|---|---|
| 6,558,287 B2 | 5/2003 | Hayabuchi et al. | |
| 6,572,507 B1 | 6/2003 | Korkmaz et al. | |
| 6,634,980 B1 | 10/2003 | Ziemer | |
| 6,723,018 B2 | 4/2004 | Hayabuchi et al. | |
| 6,929,576 B2 * | 8/2005 | Armstrong et al. | 475/278 |
| 7,204,780 B2 * | 4/2007 | Klemen | 475/279 |
| 7,285,069 B2 * | 10/2007 | Klemen | 475/275 |
| 7,311,635 B2 * | 12/2007 | Klemen | 475/286 |
| 2002/0091032 A1 | 7/2002 | Hayabuchi et al. | |
| 2002/0183160 A1 | 12/2002 | Kao et al. | |
| 2003/0083174 A1 | 5/2003 | Tabata et al. | |
| 2003/0119623 A1 | 6/2003 | Stevenson et al. | |
| 2003/0162625 A1 | 8/2003 | Raghavan et al. | |
| 2004/0092357 A1 | 5/2004 | Biermann | |
| 2004/0097324 A1 | 5/2004 | Ziemer | |
| 2004/0116238 A1 | 6/2004 | Ziemer | |

FOREIGN PATENT DOCUMENTS

| | | |
|---|---|---|
| DE | 29 36 969 A1 | 4/1981 |
| DE | 38 25 733 A1 | 2/1989 |
| DE | 42 24 360 A1 | 1/1993 |
| DE | 42 24 361 A1 | 1/1993 |
| DE | 43 02 518 A1 | 8/1993 |
| DE | 43 32 466 A1 | 3/1995 |
| DE | 197 02 198 A1 | 7/1998 |
| DE | 198 33 376 A1 | 12/1999 |
| DE | 199 12 480 A1 | 9/2000 |
| DE | 199 49 507 A1 | 4/2001 |
| DE | 696 16 117 T2 | 7/2002 |
| DE | 102 00 379 A11 | 8/2002 |
| DE | 101 15 983 A1 | 10/2002 |
| DE | 101 15 986 A1 | 10/2002 |
| DE | 101 15 987 A1 | 10/2002 |
| DE | 102 13 820 A1 | 10/2002 |
| DE | 101 46 606 A1 | 4/2003 |
| DE | 102 50 374 A1 | 6/2003 |
| DE | 101 62 877 A1 | 7/2003 |
| DE | 101 62 883 A1 | 7/2003 |
| DE | 101 62 888 A1 | 7/2003 |
| EP | 0 434 525 A1 | 6/1991 |
| EP | 0 605 953 A1 | 7/1994 |
| EP | 0 719 961 A2 | 11/1995 |
| EP | 1 265 006 A2 | 12/2002 |
| JP | 04290649 | 10/1992 |
| JP | 08200456 | 8/1996 |
| JP | 10259861 A | 9/1998 |
| JP | 2000240741 | 9/2000 |
| JP | 2001082555 | 3/2001 |
| JP | 2002323098 | 11/2002 |
| WO | WO 96/01381 | 1/1996 |

* cited by examiner

| Gear | Closed shifting elements ||||| 
|---|---|---|---|---|---|
| | A | B | C | D | E |
| 1 | ● | | | ● | |
| 2 | ● | | ● | | |
| 3 | ● | ● | | | |
| 4 | ● | | | | ● |
| 5 | | ● | | | ● |
| 6 | | | ● | | ● |
| R | | ● | | ● | |

Fig. 2

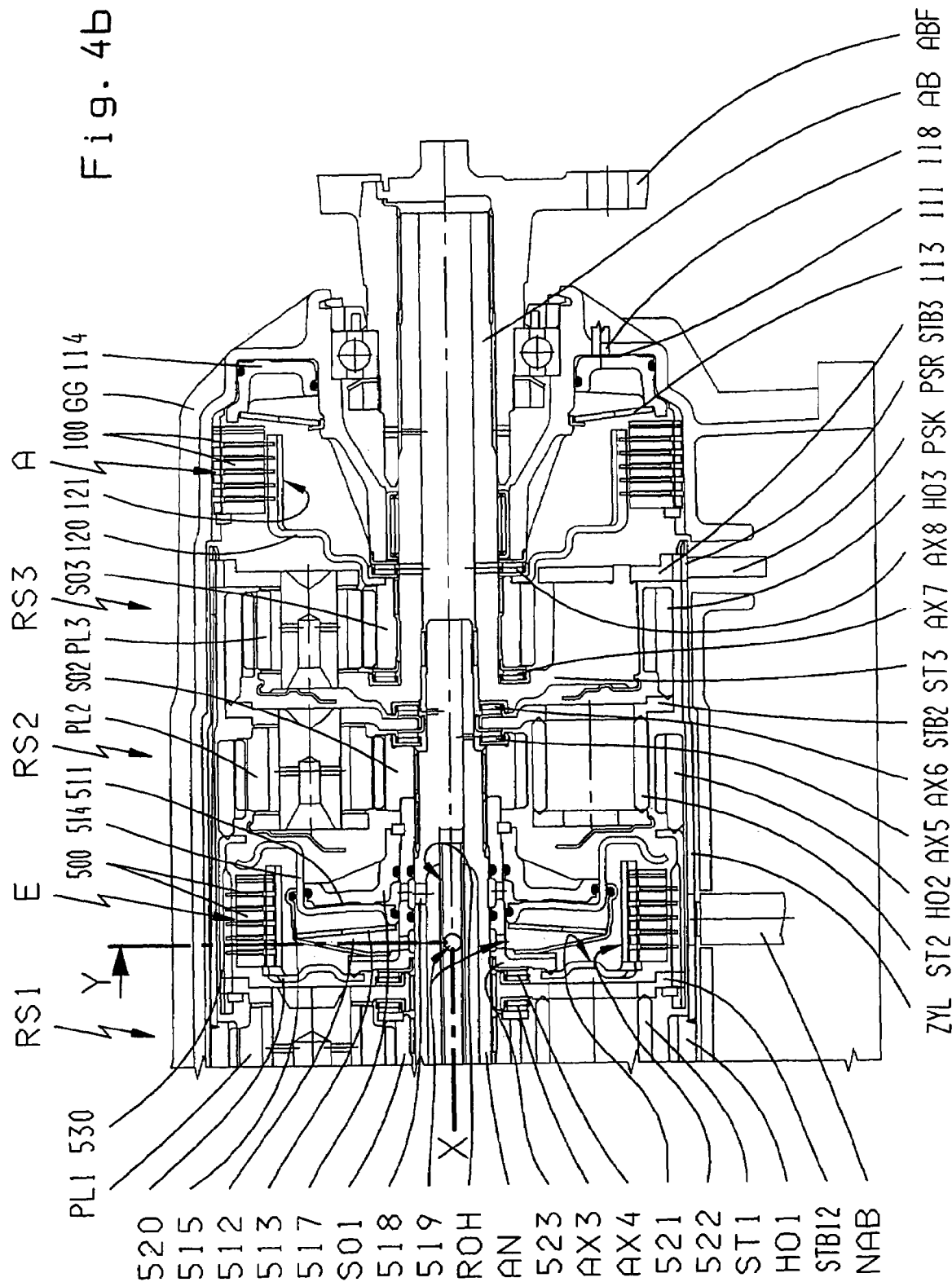

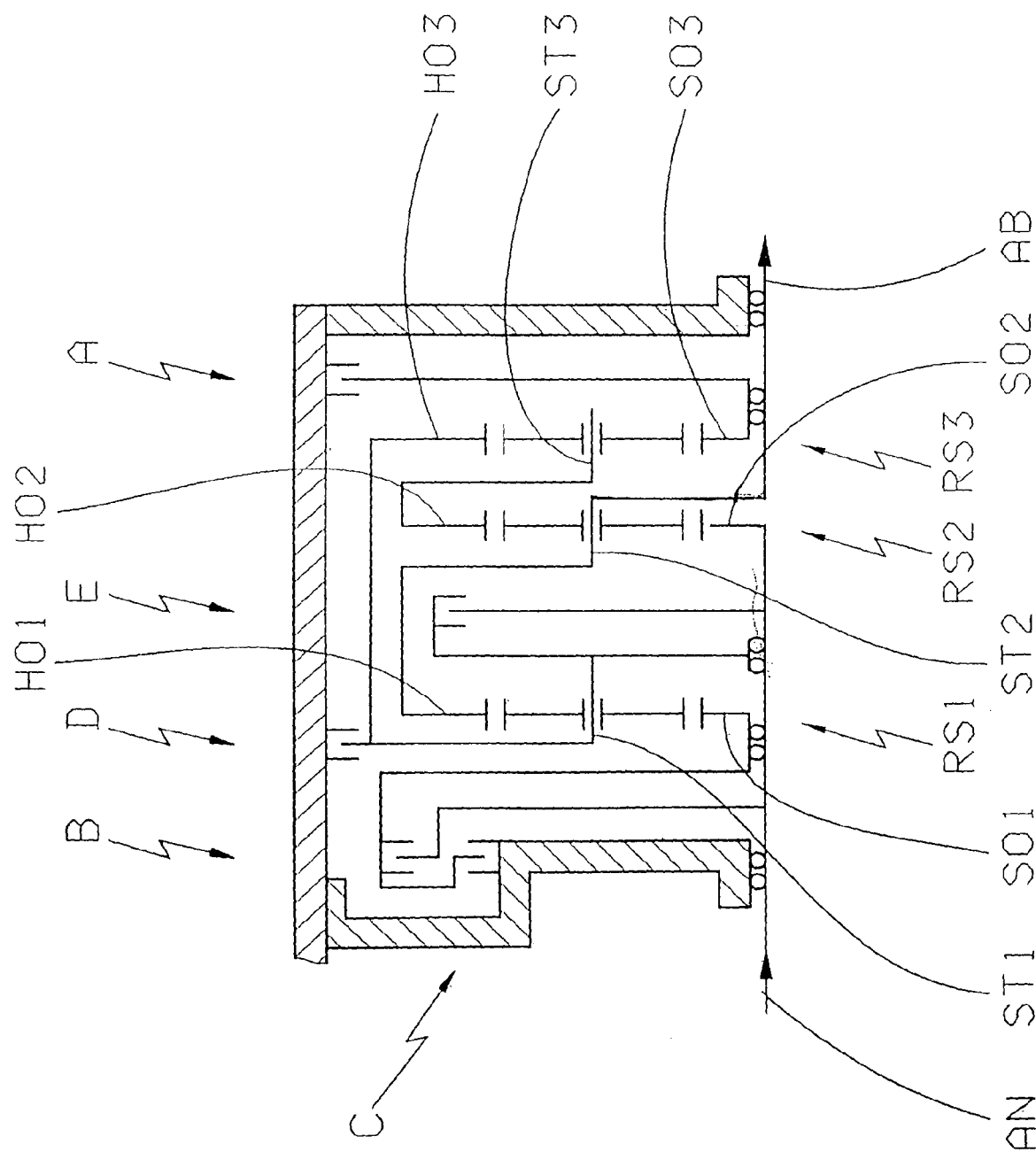

MULTISTAGE AUTOMATIC TRANSMISSION WITH THREE PLANETARY GEAR SETS

FIELD OF THE INVENTION

The present invention concerns a multistage, automatic transmission with at least three individual planet gear sets and at least five shifting elements.

BACKGROUND OF THE INVENTION

Automatic transmissions with a plurality of shiftable gears, without group shifting, are known in many examples. DE 199 12 480 A1 discloses a generic automatic transmission with three single spider planetary gear sets as well as three brake and two clutches for shifting, thus allowing six forward gears and one reverse gear. For motor vehicles, this provides a very well adapted gear-change shifting as well as a good start-up ratio in the forward direction. The individual gears are achieved by selective closure of, at each time, two of the six shifting elements, so that for the gear transfer from one used ratio to another, either higher or lower, only one shifting element need be opened and another shifting element closed.

As this is done, one input drive shaft of the automatic transmission is continually bound through a sun gear of the second planetary gear set. Further, the input drive shaft can be bound by means of the first clutch with a sun gear of the first planetary gear set and/or by means of the second clutch with a spider of the first planetary gear set. Additionally, or alternatively, the sun gear of the first planetary gear set can be bound by means of the second brake with the housing and/or a sun gear of the third planetary gear set by the third brake with the housing.

For the kinetic coupling together of the individual planetary gear set, the DE 199 12 480 A1 describes two different versions. In the first version, an output drive shaft of the automatic transmission is continually engaged with a spider of the third planetary gear set and with an internal gear of the first planetary gear set. The input drive shaft and the output drive shaft can, in this construction, be both placed coaxial to one another on opposite sides of the transmission housing as well as axis/parallel on the same side of the transmission housing. In the second version, the output drive shaft is continually engaged with the spider of the second planetary gear set and with the internal gear of the first planetary gear set, also that the spider of the first planetary gear set is continually bound with the internal gear of the third planetary gear set, and the internal gear of the second planetary gear set is continually engaged with the spider of the third planetary gear set. A construction of this type is particularly adaptable for a coaxial arrangement of the shafts for input and output.

With consideration to the spatial arrangement of the planetary gear set, DE 199 12 480 A1 teaches that the three planetary gear sets be placed coaxially in a sequence, one next to the other, whereby the second planetary gear set appears axially between the first and the third planetary gear set. Further as to the spatial arrangement of the individual shifting elements, relative to one another and relative to the planetary gear sets, DE 199 12 480 A1 also suggests, that the first and the second brakes are continually placed next to one another, whereby the second brake is always directly placed axially proximal to the first planetary gear set, and the third brake is always on that side of the planetary gear set which is remote for the third planetary gear set. With the arrangement, the two clutches are continually located directly beside one another. In a first arrangement variant, both clutches are upon that side of the third planetary gear set which is on the remote side of the first planetary gear set. In this way, the first clutch is axially directly bordering on the first brake and is closer to the first planetary gear set than is the second clutch. In connection with a non-coaxial location of the input drive shaft and the output drive shaft, in a second arrangement variant, the proposal is, that both clutches be placed on the remote side of the third planetary gear set, whereby, the second clutch is closer to the third planetary gear set than is the first clutch, and is axially located on output drive shaft active end, which placement, once again, places it on that side of the third brake which is remote side from the third planetary gear set.

The present invention, thus has the purpose of presenting an alternate arrangement of components for the automatic transmission made known as the state of the technology by DE 199 12 480 A1, wherein a compact transmission assembly is made possible and in the longitudinal direction of the transmission the design is most space saving. Preferably, the automatic transmission should find application in a motor vehicle with a standard input drive shaft and a coaxial arrangement of the input drive shaft and the output drive shaft, by means of the most simple modification possible, but, however, not installable by non-coaxial input/output drive shafts.

SUMMARY OF THE INVENTION

Using as a starting point, the generic state of the technology of DE 199 12 480 A1, the multistage automatic transmission possesses at least three coupled single planetary gear sets, which are arranged coaxial to one another, whereby the second planetary gear set, as seen spatially, is always between the first and the second planetary gear set. Furthermore, the multistage automatic transmission has at least five shifting elements. One sun gear of the third planetary gear set can be affixed on the transmission housing of the multistage automatic transmission by means of the first shifting element, which is constructed as a braking element. One input drive shaft of the multistage automatic transmission is continually engaged with a sun gear of the second planetary gear set. Also, the input drive shaft, by means of the clutch—designed as the second shifting element—is bound to a sun gear of the first planetary gear set and additionally or alternatively, joined by means of the fifth shifting element —which in turn is designed as a clutch—with a spider of the first planetary gear set. Alternative again to the above, the sun gear of the first planetary gear set, by means of the third shifting element, which is designed as a brake, and/or the spider of the first planetary gear set is connected by the fourth shifting element, which is designed as a brake, to the transmission housing.

One output drive shaft of the multistage automatic transmission is continually and actively engaged with an interior gear of the first planetary gear set, whereby the interior gear of the first planetary gear set additionally, is continually connected either with one spider of the third planetary gear set or with a spider of the second planetary gear set.

In accord with the invention, also the first planetary gear set is completely gripped by a central shaft in the axial direction, especially so gripped by the input drive shaft of the automatic transmission. Accordingly, also the second, mid-positioned planetary gear set is similarly and centrally penetrated by the input drive shaft in the axial direction. Differing from the state of the technology as stated in DE 199 12 480 A1, there is found here the fifth shifting element, by means of which the input drive shaft can be connected to the spider of the first planetary gear set, spatially observed, placed between the first and the second planetary gear sets.

Advantageously, in this arrangement is the second shifting element, by means of which the sun gear of the first planetary gear set can be bound to the input drive shaft On this said input drive shaft, is placed the first planetary gear set to be located on the oppositely lying side of the fifth shifting element. Advantageously, in this assembly, a servo-apparatus of the second shifting element is placed proximal to the first planetary gear, fortunately closer to the first planetary gear set than is placed a servo-apparatus of the third shifting element.

Even the fourth shifting element, over which the spider of the first planetary gear set may be affixed, and the third shifting element, by which the sun gear of the first planetary gear set can be fastened, can be placed on the opposite side to the fifth shifting element of the first planetary gear set, however, again when spatially observed, means beside one another above the planetary gear sets.

In an advantageous arrangement of the second, third, and fourth shifting elements, the proposal is, to integrate the servo-apparatuses for the activation of the disks of the third and fourth shifting elements, at least as far as possible into one housing outer wall of the automatic transmission, or into a connected transmission housing cover which would form an outer wall of the transmission housing. These housing outer wall arrangements, or the transmission housing cover, possess also corresponding piston space and therein slidably housed, pressure loaded pistons of the servo apparatuses of the third and fourth shifting elements, which serve for the activation of the currently used friction elements. In this way, a very simple pressure medium feed to these two shifting elements can be made possible. Also, hereto, a simple, economical mounting component grouping has been preassembled. With this embodiment, the disks of the third and the fourth shifting element can be placed, for example, directly beside the housing outer wall or the transmission housing cover. The housing outer wall and the cover have also been equipped with the third and fourth shifting elements. This arrangement allows the disks of the second shifting element to be placed more proximally to the first planetary gear set than are the disks of the fourth shifting element. The disks of the third shifting elements can be advantageously radially placed beneath the disks of the fourth shifting element.

Provision, however, can be made, so that the disks of the second and the third shifting elements are proximal to the expanded housing outer wall which is equipped with the servo apparatuses of the third and fourth shifting elements. That is to say, proximal to the full transmission housing cover which is equipped with servo apparatuses. In such a case, the disks of the fourth shifting element are located nearer to the first planetary gear set than are the disks of the second shifting element. The disks of the third shifting element are located radially underneath the disks of the second shifting element. Likewise, the servo apparatus of the third shifting element is placed radially underneath the servo apparatus of the fourth shifting element. In this way, an activation element, (activation stamp) of the servo apparatus of the fourth shifting element advantageously completely overrides the fourth shifting element, the disks of the second shifting element and the servo apparatus of the second shifting element in axial direction at least partially radially. By means of this arrangement of the components, an improved mounting characteristic is achieved for the fourth and premounted second shifting element in the transmission housing at the first planetary gear set, without dispensing with a possible oversized diameter for the disks of the thermally stressed second shifting element.

In another embodiment of the arrangement of the second, third and fourth shifting elements on one side of the first planetary gear set, all three disks packs of the second, third and fourth shifting elements can border on the transmission housing which is furnished with the third, and fourth shifting elements. This is to say, border on the transmission housing cover which is equipped with the servo apparatuses of the third and fourth shifting elements. In this case, the disks of the fourth shifting element and the disks of the second shifting element are once again above the disks of the third shifting element.

In a further embodiment of the first achievement in accord with the invention, the first shifting element, by means of which the sun gear of the third planetary gear set becomes affixed, when seen spatially is placed on that side of the third planetary gear set which is remote from the second planetary gear set.

By means of the invented coalescing of the five shifting elements and the three one-spider-planetary gear sets, can be spatially seen, that a very slim, compact transmission construction has been achieved. Such a transmission construction would be exceptionally supportive of being applied to a motor vehicle with a standard input drive wherein said input drive and the output drive run coaxially to each other. Further in such an assembly, the output shaft, which is actively connected with interior gear of the first planetary gear set centrally and axially extends itself through the third planetary gear set and a clutch space of the first shifting element. For an application having an non-coaxial arrangement of the input drive shaft and the output shaft, thus, for example, with a parallel axis or angular disposal of the input drive shaft and the output drive shaft, the output shaft can, again when seen spatially, can be actively connected with the internal gear of the first planetary gear set radially above the planetary gear sets.

The component assembly in accord with the invention can be employed both in the state of the technology for a planetary gear scheme as disclosed by DE 199 12 480 A1. In case the interior gear of the first planetary gear set and the spider of the third planetary gear set and the output drive shaft are coupled together, then the spider of the second planetary gear set is continually engaged with an interior gear of the third planetary gear set and the spider of the first planetary gear set is also so engaged with an interior gear of the second planetary gear set. In case the interior gear of the first planetary gear set and the spider of the second planetary gear set and the output shaft are coupled together, then the spider of the third planetary gear set is in continuous engagement with the second planetary gear set and the spider of the first planetary gear set is continually meshed with the third planetary gear set.

By means of this kinetic coupling of the individual planetary gear set element with one another, as well as with the input drive shaft and the output drive shaft by means of the five shifting elements—as taught by the state of the technology of the DE 199 12 480 A1—all together six forward gears are so shiftable, that upon shifting from one gear into the next following gear, be this higher or lower in ratio from the existing activated shifting elements, at any time, only one shifting element is opened and an additional shifting element is closed.

BRIEF DESCRIPTION OF THE DRAWINGS

The invention will now be described, by way of example, with reference to the accompanying drawings in which:

FIG. 2 is a switching scheme of the transmission in accord with FIG. 1;

FIG. 13 is an exemplary variation of the schematic component assembly arrangement in accord with FIG. 3, having a modified coupling of the individual planetary gear elements.

DETAILED DESCRIPTION OF THE INVENTION

Figure 1:
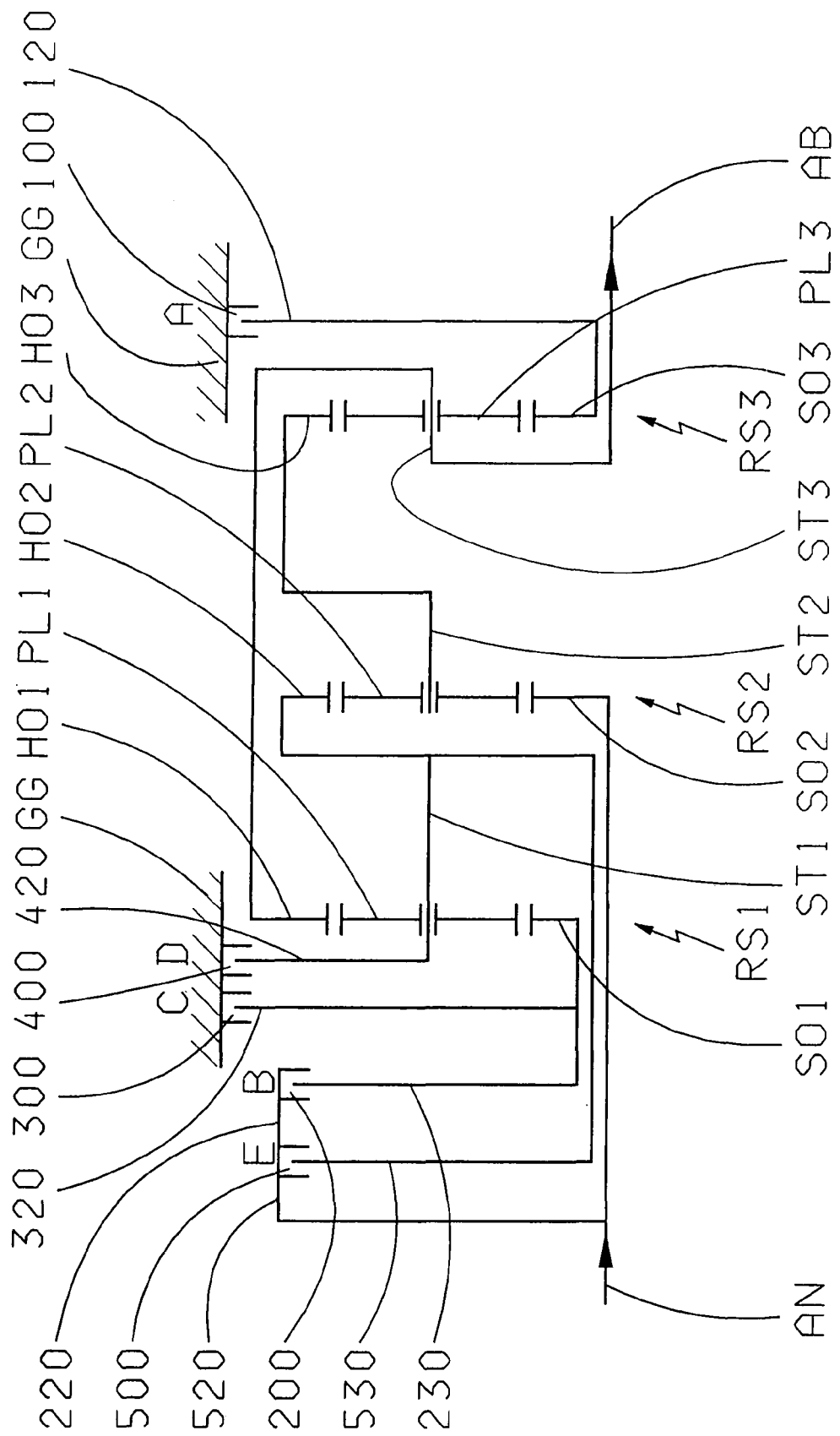
FIG. 1 is a schematic drawing of a transmission in accord with the state of the technology.

For the purpose of clarification of the invented component arrangements, FIG. 1 first exhibits a transmission scheme of a multistage automatic transmission for a motor vehicle with a standard power drive, as this may be seen from the state of the technology disclosed by the DE 199 12 480 A1. An input drive shaft of the automatic transmission is designated as AN, which is actively engaged with a (not shown) drive motor, possibly by means of a torque converter, a start-up clutch, a torsion damper, a double weighted flywheel, or a rigid shaft. AB denotes a transmission output shaft, which interacts with at least one input axle of the motor vehicle. In the present embodiment, the input shaft AN and the output shaft AB are placed coaxially to one another. RS1, RS2 and RS3 indicate three coupled, simple planetary gear sets, which are shown here beside one another in a row in a transmission housing GG. All three planetary gear sets RS1, RS2 and RS3 possess, respectively, one sun gear SO1, SO2, and SO3, respectively one interior gear HO1, HO2, and HO3. Likewise each has one spider, namely ST1, ST2 and ST3 with associated planet gears PL1, PL2 and PL3, which, respectively, interact with the sun and internal gears of the respective planetary gear sets. A to E designate five shifting elements, wherein the first, third and fourth shifting element A, C, D serve as a brake and the second and fourth shifting elements B and E are designed to be clutches. The respective friction covering of the five shifting elements A to E are provided as disks packets 100, 200, 300, 400 and 500 (in each case with outside/inside disks of steel or friction material). The respective input elements of the five shifting elements A to E are designated with 120, 220, 320, 420 and 520. The respective output elements of the clutches B and E are designated as 230 and 530. The connection of the individual planetary gear elements and shifting elements, relative to one another and relative to the input/output drive shafts have already been described in detail, as has the spatial arrangement of the same.

As is easily seen from the shifting scheme of FIG. 2, by selective shifting of respectively two of the five shifting elements A to E, six forward gears can be shifted to, free of group shifting and also in such a manner, that for the reshifting from one gear to the next higher or lower ratio, from the current shift mode, in any case, only one shifting element need be opened and another shifting element be closed. Closures are as follows:

| in 1st gear | brakes A and D |
| in 2nd gear | brakes A and C |
| in 3rd gear | brake A and clutch B |
| in 4th gear | brake A and clutch E |
| in 5th gear | clutch B and clutch E; and |
| in 6th gear | brake C and clutch E. |

Where reverse driving is concerned, this being "R", then clutch B and brake D are closed.

Referring to FIGS. 3 to 9, in the following, now four examples of a component arrangement will be explained in detail. With the aid of FIGS. 10 to 12, three examples of component assemblies in connection with non-coaxial arrangement of the input drive shaft and the output drive shaft are discussed. Likewise, with FIG. 13, one variation for the coupling of individual planetary gear set elements with one another.

Figure 3:
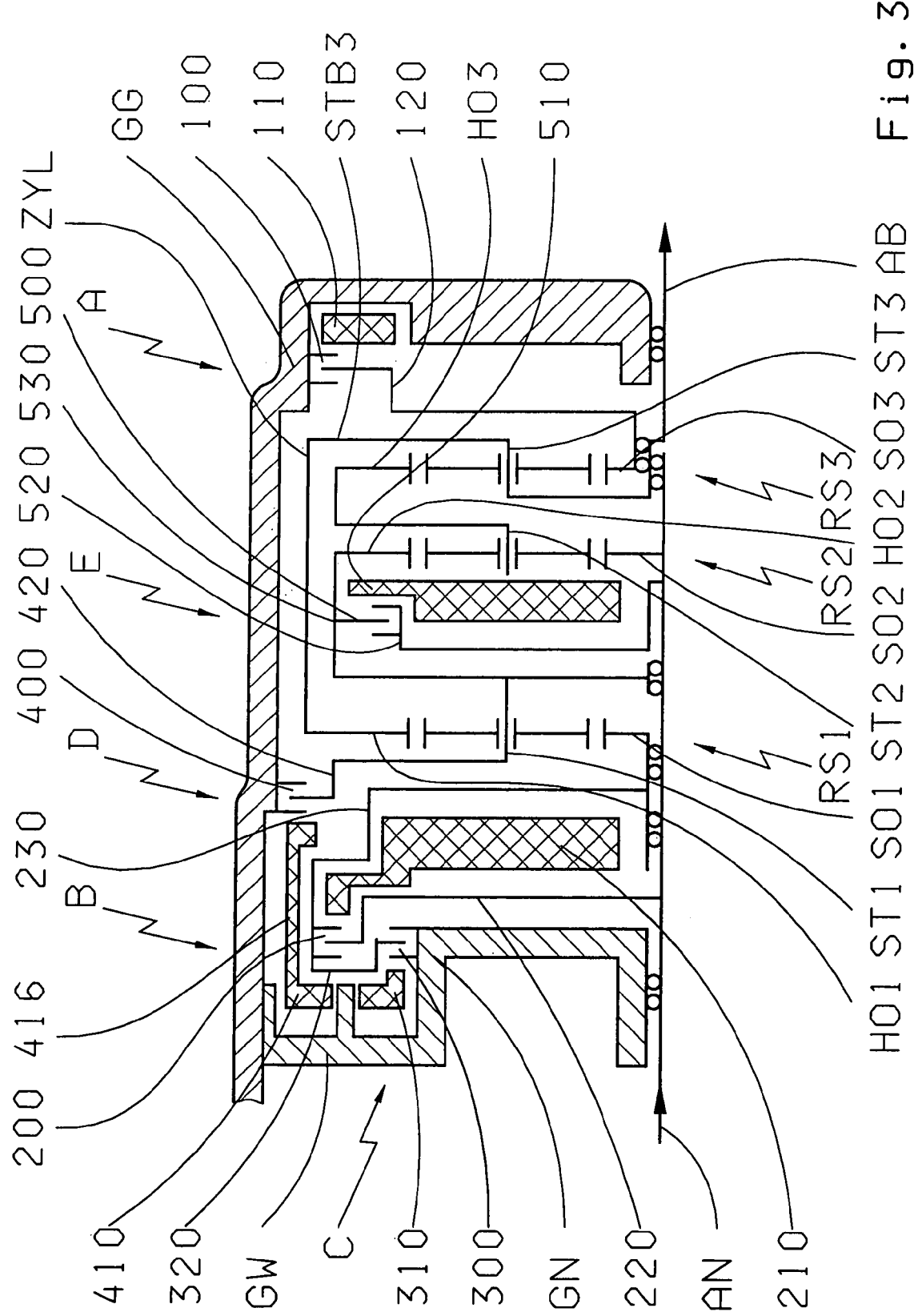
FIG. 3 is an example of a first schematic component assembly in accord with the invention.

Looking now at FIG. 3, there is shown a first schematic component arrangement, particularly for the solution, in accord with the invention, of the stated problem. Starting a discussion from the previously described state of the technology as expressed by DE 199 12 480 A1, the invented multistage automatic transmission possesses three single planetary gear sets, RS1, RS2, RS3, which are placed coaxially aligned, and coupled with each other. Seen spatially, the second planetary gear set RS2 is placed axially between the first and the third planetary gear sets RS1 and RS3. In this way the second planetary gear set borders axially and directly on the third planetary gear set RS3. Further, the multistage automatic transmission has five shifting elements A to E. The first, third and fourth shifting element A, C, D are respectively designed as brakes (in the shown embodiment, in each case as a disks brake). The second and the fifth shifting elements B, E respectively serve the purpose of a clutch (in the shown embodiment, in each case as a disks clutch). One sun gear SO3 of the third planetary gear set RS3 can be affixed on a transmission housing GG by means of the brake A. One input drive shaft AN of the multistage automatic transmission is continually connected to a sun gear SO2 of the second planetary gear set RS2. Further, the input drive shaft AN, by means of the clutch B, is coupled with a sun gear SO1 of the first planetary gear set RS1. Additionally, or alternatively, by means of the clutch E, and with a spider ST1, the first planetary gear set RS1 can be connected to the input shaft AN. Alternatively, the sun gear SO1 of the first planetary gear set RS1, by means of the brake C and/or the spider ST1 of the first planetary gear set RS1 by means of the brake D, can be affixed to the transmission housing GG.

One output drive shaft AB of the multistage automatic transmission is continually connected with an internal gear HO1 of the first planetary gear set RS1, whereby this internal gear HO1, in the here presented exemplary coupling of the planetary gear elements is additionally continually connected with a spider ST3 of the third planetary gear set RS3. Yet further, a spider ST2 of the second planetary gear set RS2 is continually engaged with an internal gear HO3 of the third planetary gear set RS3, as well as spider ST1 of the first planetary gear set RS1 is continually in connection with an internal gear HO2 of the second planetary gear set RS2. The corresponding connective element between the interior gear HO1 of the of the first planetary gear set RS1 and the spider ST3 of the third planetary gear set RS3 is designed as cylinder ZYL. This cylinder ZYL first, is connected with interior gear HO1 by means of an appropriate operative connection, for instance by welding, and extends itself in an axial direction from the interior gear HO1 up to beyond the internal gear HO3. Second, the cylinder ZYL on that side of the third planetary gear set RS3 remote from the second planetary gear set RS2 is connected with a web plate STB3 of the spider ST3 by means of a corresponding operational binding, this binding would be, for example, by means of a "come-along" profile. The cylinder ZYL completely overlaps the second and third planetary gear sets, namely RS2, RS3.

The first planetary gear set RS1 is only fully connected, centrally, in the axial direction by the input drive shaft AN. Likewise, the second, when seen spatially, mid-located planetary gear set RS2 is only connected, centrally, in the axial direction by this same input drive shaft AN. For the achievement of a favorable bearing seating for the input drive shaft AN and the output drive shaft AB, in the area of the third planetary gear set RS3, the input drive shaft AN extends itself somewhat farther axially up to under the sun gear SO3 of the third planetary gear set RS3. The output drive shaft AB, in this zone is radially borne on the input drive shaft AN, whereby the output shaft AB, which is operationally connected with the internal gear HO1 of the first planetary gear set RS1 actively penetrates the third planetary gear set RS3 in the axial direction. The sun gear SO3 of the third planetary gear set RS3, once again, is borne on the output drive shaft AB.

The clutch E, by means of which the input drive shaft AN can be bound with the spider ST1 of the first planetary gear set RS1, is seen, again placed spatially, between the first and the second planetary gear sets RS1 and RS2. As may be seen in FIG. 3, the inner disks of the lamella-packet 500 of the clutch E, are in this embodiment, is here shown as steel lamella, while the outer disks of the lamella-packet 500 of the clutch E are correspondingly made of friction material disks.

An inlet element 520 of the clutch E is, in this arrangement, designed as an inner lamella carrier and is connected with the input drive shaft AN. Correspondingly, an outlet element 530 of the clutch E is provided as an outside lamella carrier, which is connected with both internal gear HO2 of the second planetary gear set RS2 as well as with the spider ST1 of the first planetary gear set RS1. In the here presented example, this outer disks carrier (530) of the clutch E is designed as a cylinder, which, on one side is connected with the internal gear HO2 of the second planetary gear set RS2, and on the other side is connected with the spider ST1 of the first planetary gear set RS1, within which is contained the disks packet 500 of the clutch E. The automatic transmission disks packet 500 of the clutch E, bears the full torque which is communicated to the input drive shaft AN by the (not shown for clarification) drive motor, which furnishes the entire drive moment. Consequently, these disks 500 possesses, advantageously, a larger diameter and are placed radially underneath the cylinder ZYL. A servo-apparatus 510 of the clutch E, serving for the activation of the disks 500, axially borders directly on the second planetary gear set RS2 and activates the disks 500 axially in the direction of the first planetary gear set RS1. As this is done, this servo-apparatus 510 is placed above the inner lamella carrier 520 of the clutch E on the input drive shaft AN and rotates always at the speed of rotation of the input shaft AN. Obviously, the servo-apparatus of the fifth shifting element can also be placed directly on the input drive shaft.

The brake D, by means of which the spider ST1 of the first planetary gear set RS1 can be made affixed, the brake C, by which the sun gear SO1 of the first planetary gear set RS1 is made affixed, as well as the clutch B, by means of which the sun gear SO1 of the first planetary gear set RS1 is engaged with the input drive shaft AN, are all placed on the side of the first planetary gear set RS1, opposite to which lies the clutch E.

An input element 220 of the clutch B is, in this arrangement, designed as an inner disks carrier and is connected with the input drive shaft AN. Correspondingly, an output element 230 for the clutch B serves as an outside disks carrier, which is connected both with the sun gear SO1 of the first planetary gear set RS1 as well as with a input element 320 of the brake C. In the presented example, this outside disks carrier (230) of the clutch B serves as an open cylinder placed against the first planetary gear set RS1, the cylinder base of the clutch bordering, partially axially the first planetary gear set RS1, and borders partially axially the input element 420 of the brake E, which element serves as an inner disks carrier and is also connected to the sun gear SO1 and is supported on bearing on the input drive shaft AN. Within the outside disks carrier (230) of the clutch B, and radial beneath a cylinder shell of this outside disks carrier 230, is placed a disks packet 200 with outer-plus-friction disks of the clutch B and a servo apparatus 210 of the clutch B. The servo apparatus 210 activates the disks 200 in the opposite direction to that of the first planetary gear set RS1. Conditioned by means of the planetary gear concept, the clutch B is highly thermally stressed, since it is loaded with the full input drive torque of the drive motor which activates the input drive shaft AN of the automatic transmission, and further, has a relatively high differential speed of revolution to shift. Correspondingly advantageous is the arrangement of the disks packet 200 of the clutch B, is a large diameter. The input element 320 of the brake C, which operates as the friction disks carrier, is connected with the outside disks carrier 230 of the clutch B, which said carrier is on that side of the first planetary gear set RS1 which is remote from the disks packet 200. As a result, this active connection can well be designed as a "come-along" profile, especially with profile apportionment being equal to the disks come-along toothing of the outside disks carrier of the clutch B.

A disks packet 300 with steel and friction disks of the brake C is construction length saving, in the axial direction, radially beneath the disks packet 200 of the clutch B. It is further, when seen spatially, within a clutch space of the clutch B, which is formed by the outer disks carrier 230 of the clutch B. Thereby, the disks packet 300 is directly proximal to the inner disks carrier 220 of the clutch B, upon which clutch the servo apparatus 210, that is, on the remote side of the first planetary gear set RS1. One disks carrier designed for the acceptance of steel disks of the brake C is integrated in a simple manner in a housing wall GW, which said wall forms an outer wall for the transmission housing GG. The location is situated radially above a hub GN extending itself from the inner space of the transmission housing wall GW. In this arrangement, the housing wall GW is connected to the transmission housing GG, for example, bolted thereto. Obviously, the housing wall GW and the hub GN can also be made as separate components, bound to one another. Likewise, it is possible that the housing wall GW and the transmission housing GG can be cast as one piece. As is shown in FIG. 3, however, the inserted part 320 of the brake C is so designed, that the friction type disks of the disks packet 300 are picked up on their outside diameter by the friction disks carrier 320 of the brake C.

A servo apparatus 310 of the brake C is integrated into the housing wall GW in a simple manner, advantageously radially above the hub GN. This servo apparatus 310 activates the disks 300 of the brake C axially in the direction of the first planetary gear set RS1. For this purpose, the housing wall GW possesses a corresponding piston pressure space and a pressure slidable piston therein. The piston is a component of the servo apparatus 310, as well as a corresponding (not shown here) feed channel to the piston pressure space.

Likewise, integrated into the housing wall GW, is a servo apparatus 410 of the brake D, which, as seen spatially, is located radially above the servo apparatus 310 of the brake C. The housing wall GW possesses also a corresponding piston pressure medium space and a therein, slidingly located pressure responsive piston of the servo apparatus 410, as well as a corresponding (not shown) pressure medium fee channel to the piston pressure space. For the activation of the disks 400 of the brake D, the servo apparatus 410 additionally possesses an activation stamp 416, which encompasses the disks 200 and the clutch B fully and the servo apparatus 210 of the clutch B only partially, as seen in the axial direction. The stamp also transmits the piston force of the servo apparatus 410 to the disks 400 of the brake D. Designed as a thin-walled cylinder, this activation stamp 416 of the servo apparatus 410 does not disadvantage the radial acting space of the clutch B to any significant degree.

The integration of both servo apparatuses 310, 410 into the housing wall GW enables a very simple pressure medium feed to these two brakes C and D, as well as allowing an easy pre-assembly which contributes to the economy of the major assembly of the component groups. By means of the design of the servo assembly 410 with the activation stamp 416, there has been achieved an improved assembly capability of the brake D and the (pre-mounted) clutch B in the transmission housing GG on the first planetary gear set RS1. This is done without dispensing with the large diameter of the disks 200 for the highly thermally stressed clutch B, and without doing away with the largest possible diameter for the disks of the statically highest stressed brake D of all the given five shifting elements A to E.

Remaining with FIG. 3, the servo apparatus 210, which is first proximal to the planetary gear set RS1 and second serving the second shifting element B, is placed closer to the first planetary gear set RS1 than is the complete servo apparatus 310 of the third shifting element C and yet closer than the pressure space of the servo apparatus 410 of the fourth shifting element D. Likewise, the disks 400 of the fourth shifting element D are placed closer to the first planetary gear set RS1 than the disks of the second shifting element B. In another embodiment, however, provision can be made, that the disks of the second shifting element is nearer to the first planetary gear set RS1 than the disks of the fourth shifting element D, whereby the disks of the third and the fourth shifting elements, namely C, D are placed adjacent to the housing outer wall and the servo apparatuses of the third and fourth shifting elements are integrated into this outer wall. In this way, the disks of the third shifting element are placed radially beneath the disks of the fourth shifting element.

Inspecting FIG. 3 even further, it is obvious that the brake A, by means of which the sun gear SO3 of the third planetary gear set RS3 can be affixed, when spatially observed, is on that side of the third planetary gear set RS3 which is remote from the second planetary gear set RS2. In this way, an input element 120, designed as a inner disks carrier, borders the brake A axially at the spider ST3 of the third planetary gear set RS3 at a location remote from the second planetary gear set SR2. A disks packet 100 of the brake A with outward and frictional disks is found on the large diameter in the area of the outer wall of the transmission housing GG remote from the third planetary gear set RS3. A "come-along" profiling for the outer disks of the disks packet 100 can, in a simple manner, be integrated into the transmission housing GG. Obviously, it is possible, for the brake A to have a separate outer disks carrier, which, by means of appropriate means is bound to the transmission housing GG in a form-fit, force or material closure manner. A servo apparatus 110 of the brake A, for the activation of the disks 100 is integrated in a simple manner into the outer wall of the transmission housing GG and activates the disks 100 axially in the direction of the three planetary gear sets RS1, RS2, RS3, wherein this outer wall can also be designed as a housing cover, which is attached to the transmission housing GG, for example, by bolting. For this purpose the transmission housing GG possesses a corresponding piston space (for pressure) and a pressure responsive, slidable piston therein, said piston being a component of the servo apparatus 110. Also a corresponding (not shown here) pressure medium feed path is so provided for this piston space. The clutch A is also completely and centrally penetratively contained axially by the output shaft AB.

By means of the component arrangement depicted in FIG. 3, when seen spatially, a very slim, compact transmission construction has been achieved, which adapts itself particularly well for installation in a motor vehicle with a standard transmission. Accordingly, in FIG. 3, there is located (for the sake of simplicity, not shown here) with the input drive shaft AN an operationally connected drive motor of the automatic transmission on the side of the shifting elements B, C, D, which lie opposite to the first planetary gear set RS1, and whereby clutch A (a brake) is accordingly placed on the output side of the automatic transmission drive.

The shifting scheme of the multi-stage automatic transmission in accord with FIG. 3, corresponds to that which is presented in FIG. 2. In accord with the state of the technology of DE 199 12 480 A1, by means of selective shifting of at any time, two of the five shifting elements, thus six forward gears can be (non-groupwise) shifted.

Figure 4A:
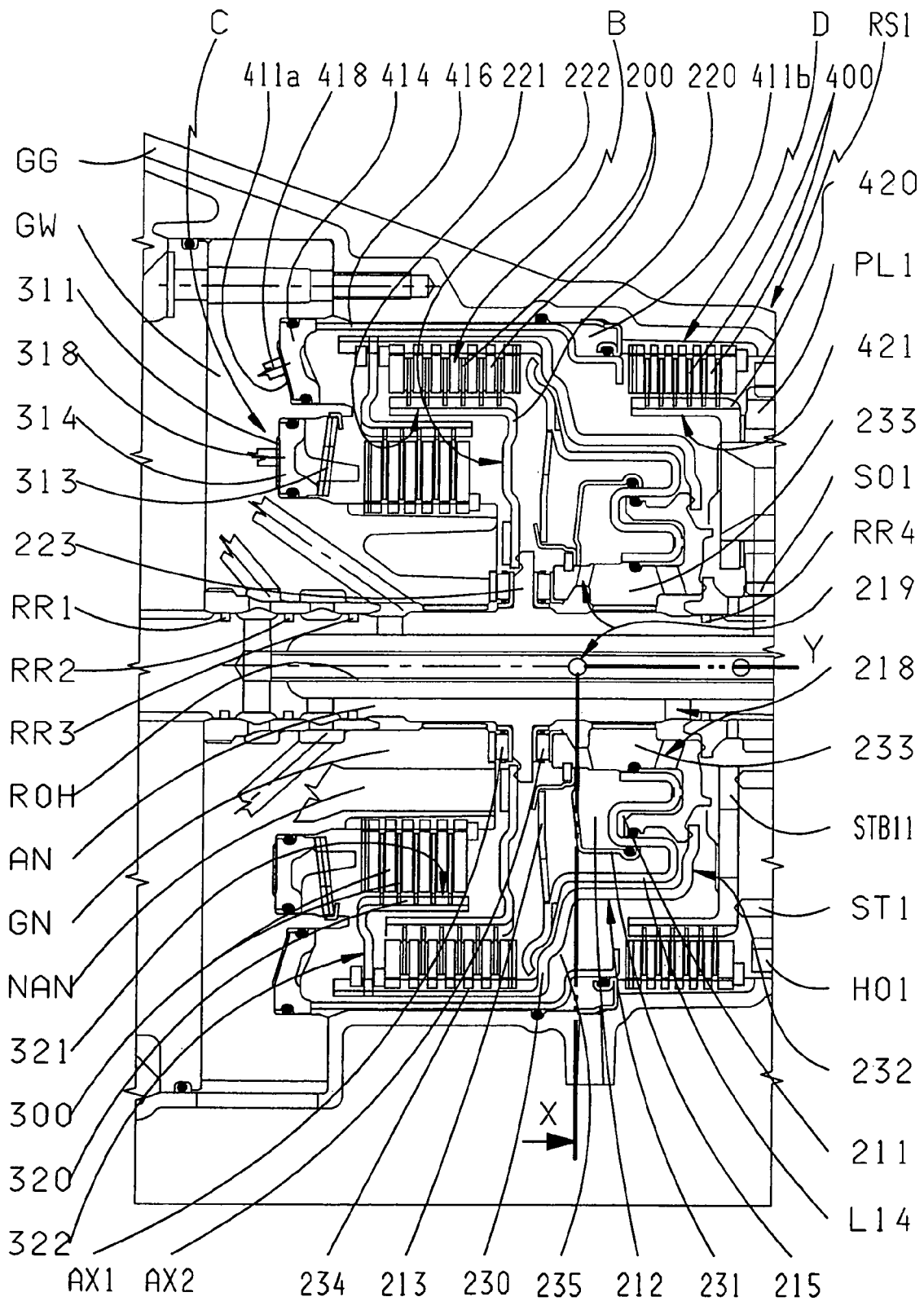
FIG. 4 is a section of a transmission in accord with FIG. 3, presented in two partial sections, namely FIG. 4a and FIG. 4b.

Now considering FIG. 4 (4a and 4b in their entirety) a practically assembled transmission construction is explained, wherein the kinematic coupling and the spatial arrangement of the three single planetary gear sets RS1, RS2, RS3 and the five shifting elements A to E, within the transmission housing GG and relative to one another in the principle of that of FIG. 3 are all schematically presented. Corresponding to the coaxial arrangement of input and output drive shafts, namely AN, AB in this embodiment example, the automatic transmission for a motor vehicle with a standard drive is provided. For a better presentation, the transmission depiction is divided into two sections, namely 4a and 4b. In this manner, that part of the automatic transmission proximal to the drive motor (not shown) is in FIG. 4a and that part of the output side power of the automatic transmission is shown in FIG. 4b.

FIG. 4a illustrates a housing wall GW bolted to the transmission housing GG, thus forming an outer wall in the direction of (not shown) the drive motor. This may be expressed also in the direction of a probable drive unit located outside of the transmission housing GG (for instance, this could be a torque converter or a drive coupling) for the automatic transmission. This housing wall GW possesses in detail, pressure medium channels (not shown) and can also have thereto an oil pump for pressure and lubrication means distribution for the automatic transmission. Extending itself axially, in the direction of the inner space of the transmission housing GG, is a hub GN of the housing wall GW. In another embodiment, this hub GN could be built, for instance, as the guide gear shaft of a torque converter. Radially situated, inside the hub GN runs the input drive shaft AN of the automatic transmission and, as it does so, centrally penetrates the housing wall GW.

Seen in the axial direction, radially placed above the hub GN, is the disks packet 300 with both steel and frictional disks of the brake C. In this arrangement, the hub GN assumes the function of a disks carrier for the steel disks of the disks packet 300, and for this purpose possesses a specific lamella come-along profile, which engages into a complementary inner profile on the inner diameter of these steel disks. The servo apparatus 310 of the brake C is integrated into the housing wall GW. For this purpose, the housing wall GW possesses a corresponding piston/pressure space 311, as well as a corresponding pressure medium channel 318 leading to this said pressure space 311. In this piston (i.e. pressure) space is slidingly supported a pressure responsive piston 314 of the servo apparatus of the brake C. In the case of a pressure application of the pressure space 311, the piston 314 is activated to move the disks 300 of the brake C against a resisting force of a restorative element 313, acting in an axial direction relative to the transmission housing interior space. The restorative force element 313 is here, as an example, presented as two plate springs operating in succession.

Seen in the direction of the transmission housing interior space, the clutch B is placed to be proximal to the brake C. Thereby the disks packet 200 with the outer and frictional disks of the clutch B, as seen in the axial direction, extends itself at least in a wide ranging radial manner above the disks packet 300 of the brake C. The servo apparatus of the clutch B finds itself beside the disks packet 300 of the brake C. The input element 220 of the clutch B is designed also as an inner disks carrier. A disk shaped section 223 of this input element 220 borders directly axially on the disks packet 300 and, by means of hub 233, makes a form-fit with the input drive shaft AN and extends itself radially outward up to a diameter, which is greater than the is the outside diameter of the disks packet 300 of the brake C. A cylindrical section 221 of this entry element 220 connects itself onto the outside diameter of the disk shaped section 223, and extends itself axially in the direction of the housing wall GW and possesses a come-along profile for the friction disks of the disks packet 200 of the clutch B.

The output element 230 of the clutch B is designed as an outer disks carrier, in the form of an open container, facing in the direction of the housing wall GW, within which the complete servo apparatus of the clutch B and the disks packet 200 of the clutch B can be found. A hub 233 of this outside disks carrier 230 is carried on the input drive shaft AN and connected, on its side remote from the housing wall GW, with sun gear SO1 of the first planetary gear set RS1. Axially bordering proximal to the housing wall GW of a first spider plate STN 1l of the spider of the first planetary gear set RS1 is connected a first disk shaped section 232 of the outer element 230 on this hub 233, and extends itself radial outward to a diameter, which is somewhat smaller than the inside diameter of the interior gear HO1 of the first planetary gear set RS1. At the outside diameter of this first platelike section 232, there is connected a first cylinder shaped section 231 of the outer element 230 and extends itself axially in the direction of the housing wall GW up to the area of the housing wall GW (forward) zone of hub 233. Finally, there connects to this first cylinder shaped section 231 a second disk shaped section 235 of the outer element 230, which extends itself radially outward up to a diameter, which is somewhat in accord with the outside diameter of the disks packet 200 of the clutch B. At this outside diameter of this second disk shaped section 235, there is connected a second cylinder shaped section 234 of the output element 230, which element possesses a corresponding come-along profile for the acceptance of the outside disks of the clutch B and extends itself axially in the direction of the housing wall GW up to more than the disks packet 200 of the clutch B, thus up to a range approaching the housing wall GW.

As has already been mentioned, within the outside disks carrier 230 of the clutch B, is located the entire servo apparatus of the clutch B. To this end, the hub 233 of the outside disks carrier 230, of the clutch B, possesses a piston and associated pressure space 211, which allows for a pressure reactive piston 215, slidably installed in said space, and which piston is a component of the servo apparatus of the clutch B. Further contained therein is corresponding pressure medium channels to this pressure space 211. Under the circumstances of an application of pressure in the pressure space 211, the piston 215 activates the disks 200 of the clutch B against the restorative force of the restoring element 213 (in this embodiment, shown as a plate spring), moving in an axial direction to the housing wall GW, thus in a converse direction to the first planetary gear set RS1. For the balance of a dynamic pressure of that continual pressure with a given speed of rotation of the sun gear SO1 of the first planetary gear set RS1 rotating (filled with pressure medium) said pressure space 211, the servo apparatus of the clutch B possesses additionally a pressure compensation space 212, which, is filled with non-pressurized lubricating oil. This pressure compensation space 212 borders on the piston 214 upon that side thereof which is remote from the pressure space 211 and is formed by this piston 214 itself and a push-plate 215. Spatially seen, both the pressure space 211 as well as the pressure compensation space 212 are placed within a cylindrical space, which is created by the first disk shaped section 232 of the outside disks carrier 230 of the clutch B. The pressure medium and the lubricating oil feed to the pressure space 211 or the pressure compensation space 212 is done centrally by the input drive shaft AN outward from corresponding feed borings 218, 219. The pressure and lubrication media feed within the input drive shaft AN are more completely explained below with the aid of FIG. 6.

As is further detailed in FIG. 4*a*, the input element 320, serving also as a friction disks carrier for the brake C, possesses a cylindrical section 321 with a come-along profile for the friction disks of the brake C, which, seen spatially, extends itself radially underneath the cylindrical section 221 of the input element 220 of the clutch B. On this cylindrical section 321 on the side proximal to the housing wall GW, there is connected a disk shaped section 322 of the input element 320 of the brake C and extends itself above and radially outward of the disks packet 300 of the brake C, until it reaches the outside disks carrier 230 of the clutch B, with which it is form-fit connection bound in the area of the open end of the second cylindrical section 234. In an advantageous manner for the technology of manufacture, this form fit connection is made by means of the same come-along profile of the outside disks carrier 230 of the clutch B, as for the outside disks of the disks packet 200 of the clutch B. Thus both the disks packet 300 of the brake C, when viewed spatially, is completely installed inside a clutch space of the clutch B, which clutch space is formed by the outside disks carrier of the clutch B.

The disks packet 400 with outside and friction disks of the brake D is seen in axial direction at least far reaching radially located above the first cylindrical section 231 of the outside disks carrier 230 of the clutch B. The transmission housing GG possesses in this area, in an advantageous manner for manufacture, a come-along profile for the reception of the outside disks of the disks packet 400. In this manner, the greatest possible lamella diameter is achieved for the brake D, which, in the concept of all five shifting elements, carries the greatest static load. The spider plate STB11, bordering on the outside lamella carrier 230 of the clutch B, of the first planetary gear set RS1 forms at the same time the input element 420 of the brake C. To this end, a cylindrical section 421 closes this input element 420 which serves as a carrier for the inner disks at the outside diameter of the first spider plate STB11, but extends itself axial in the direction of the housing wall GW, and possesses a corresponding come-along profile for the acceptance of the frictional disks of the brake D.

In the exemplary detail design, the servo apparatus of the brake D possesses two pistons and piston pressure spaces, namely, 411a and 411b. These pistons and spaces can be applied with pressure independently of one another, so that the disks 400 of the brake D can form a working activity force from the pressure difference of the two 411a, 411b. The first piston/pressure space 411a of the brake C—together with its pressure medium channels 418—is integrated into the housing wall GW, on a diameter above the piston 314 of the brake C, and acts upon a piston 414, which is slidably placed in a corresponding piston space of the housing wall GW. The piston 414 again activates an activation stamp 416, which, simultaneously and together with a section of the transmission housing GG forms the second pressure space 411b. In the case of an application of pressure of one of (or both) pressure spaces, 411a, 411b the activation stamp 416 activates the disks 400 of the brake D axially in the direction of the first planetary gear set RS1. The activation stamp 416 serves also as an operational binding between the piston 415 and the disks packet 400, it also introduces the activation force of the piston 415 again to the disks packet 400.

Figure 5:
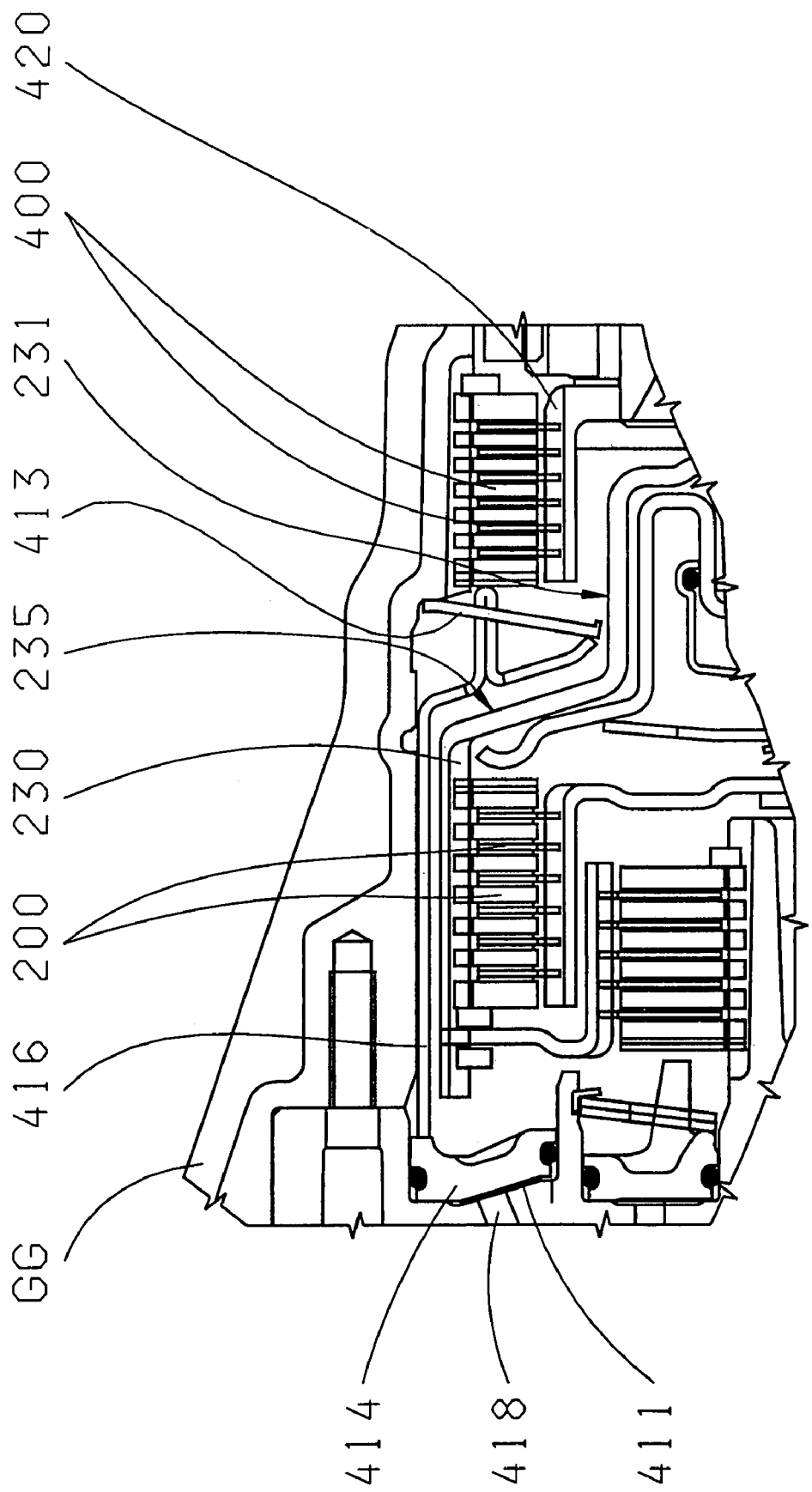
FIG. 5 is a sectional transmission with an alternative shifting element activation.

Optionally to, or alternatively to the second pressure space 411b, a restoration element, for instance a plate spring can be provided, which produces a replacement force for the piston 414 of the brake D and abuts itself first on the transmission housing GG and second on the activation stamp 416, whereby the activation stamp 416 then moves through corresponding recesses of the restoration element in the axial direction. Such an alternative detail construction is shown in FIG. 5 as a partial transmission section. The single pressure medium space here of the servo apparatus of the brake D is designated as 411. Further, designated as 413 is the restorative element which acts upon the piston 414 and is penetrated by the activation stamp 416.

As may be seen from FIG. 4a, the present invention permits a very compact arrangement of the clutch B and the two brakes C, D together on one side of the first planetary gear set RS1 in connection with the integration of the servo apparatuses of the two brakes C, D in the housing wall GW. The shown arrangement of the individual disks packets 200, 300, 400 enables in each case a favorable dimensioning, in accord with the individual characteristics and thermal stress of these three shifting elements B, C, D.

Additionally integrated in the housing wall GW is an apparatus for the measurement of the speed of rotation of the input drive shaft AN. For this purpose at least one tachometer sensor NAN is set into an axial boring of the housing wall GW and contacts axially and without touching a correspondingly constructed measurement surface of the disk shaped section 222 of the inner disks carrier 220 which is connected to the input drive shaft AN of the clutch B.

Observed spatially, the first planetary gear set RS1 axially connects to the servo apparatus of the clutch B and also on the disks packet 400 of the brake D. The sun gear SO1 of the first planetary gear set RS1 is only centrally penetrated by the input drive shaft AN.

As may be seen further in FIG. 4b, the input and the output drive shafts, AN, AB run coaxially with one another. The spider ST1 of the first planetary gear set RS1 is placed with its side proximal to the transmission output drive (that is to say on that side remote from the three shifting elements B, C, D) on the input drive shaft AN which is affixed thereon over a sliding bearing. In a known manner, the planet gears PL1 are rotatably affixed on planet pins, with are inset in the spider ST1 (planet gear carrier) and mesh with the sun gear SO1 as well as with the interior gear HO1 of the first planetary gear set RS1.

Observed in the direction of the transmission output drive, the clutch E connects itself axially on the first planetary gear set RS1, onto the clutch E, is also connected the second planetary gear set RS2 and finally also the third planetary gear set RS3. Onto the third planetary gear set RS3 is attached the brake A, and onto the brake A is affixed an outer wall of the transmission housing GG. The clutch E, when seen spatially, is between the first and the second planetary gear sets RS1, RS2, the brake A is placed on the three shifting elements B, C, D on the opposite outer side of the automatic transmission.

In contrast to the clutch B, the inner disks of a disks packet 500 of the clutch E are constructed of steel and the outer disks of the disks packet 500 of the clutch E are correspondingly made of frictional material.

The input element 520 of the clutch E is constructed as an inner disks carrier. A disk shaped section 522 of the input element 520 is made to form fit over a hub 523 with the input drive shaft AN and extends itself—axially directly bordering on the spider ST1 of the first planetary gear set RS1—radial toward the outside up to a diameter of the disks packet 500 of the clutch E. In the area of its outside diameter, there is connected to this disk shaped section 522 a cylindrical section 521 of the input element 520, which extends itself axially in the direction of the second planetary gear set RS2. At its outside diameter, this cylindrical section 521 possesses a come-along profile for the acceptance of the steel disks of the disks packet 500.

The servo apparatus of the clutch E is placed on that side of the inner disks carrier 520 which is proximal to the second planetary gear set RS2 of the clutch E, as seen in the axial direction, radially above the hub 523 and includes a pressure space 511, a pressure compensation space 512, a piston 514, a push-disk 515 as well as a restorative element 513. On that side of the servo apparatus which is proximal to the second planetary gear set RS2, is placed a support plate 517. This is affixed on the hub 523, axially in the direction of the second planetary gear set RS2 over a security ring and is oil-tight toward the hub 523 (here shown over an O-ring). The piston 514 is supported to be axially slidable on the hub 523 and on the outside diameter of the support plate 517. The piston 514 is also oil-tight sealed against the hub 523 and against the outside diameter of the support disk 517. In this case, for example, by means of respectively one O-ring. The pressure space 511 is confined by the piston 514 and support plate 517. Further, spatially observed, the pressure space 511 is placed on that side of the support plate 517 which is proximal to the first planetary gear set RS1. The push-disk 515 borders axially on the disk shaped section 522 of the inner disks carrier 520 of the clutch E and lies also on a shoulder of the hub 523. This push-disk is oil-tight sealed against the axially slidable piston 514, again with the aid of an O-ring. The push disk 515, together with the piston 514, on that side of piston 514 which is proximal to the first planetary gear set RS1, forms the pressure compensation space 512. For the balancing of the dynamic pressure of the oil filled pressure space 511 of the clutch E, which space is continually rotating at the speed of rotation of the input drive shaft AN, the pressure compensation space is filled with non-pressurized lubrication means. The pressure medium feed to the pressure compensation space 512 of the clutch E is effected by corresponding borings in the hub 513, extending centrally outward from the input drive shaft AN. This input drive shaft AN once again, possesses pressure and lubrication media channels 518, 519 for this purpose. This will be further discussed in detail in regard to FIG. 6. In the case of pressure application into the pressure space 511, the piston 514 activates the disks 500 of the clutch E axially in the direction of the first planetary gear set RS1. Counter to this activation, a restoration force generated by a plate spring, i.e., a restoration element 513, which lies in prestressed condition between the piston 514 and the push plate 515.

The sun gear SO2 of the second planetary gear set RS2, while axially bordering on the hub 523 of the input element 520 of the clutch E, by means of a come-along profile is form fit with the input drive shaft AN. In this way, the input drive shaft AN completely penetrates the sun gear SO2 in the axial direction. In another embodiment, the possibility exists, that the sun gear SO2, by means of the hub 532 is connected with the input drive shaft AN or, that the hub 532, by means of the sun gear SO2 is connected to the input drive shaft AN. In either of these two cases, designedly, an adaptable form joint or force fit connection between the sun gear SO2 and the hub 532 is provided. In yet another embodiment, it is possible that sun gear SO2 and hub 532 are made as one piece, or are welded together. In such a case, for the capability of assembly of the servo apparatus of the clutch E, either the connection between the disk shaped section 522 of the input element of the clutch E and the hub 532 must be form fit, or, on the other hand, the arrangement of the servo apparatus of the clutch E and the disk shaped section 522 must be exchanged in their axial alignment. If the latter is carried out, then also the activation apparatus of the disks 500 must be changed.

In a known manner, the planet gear PL2 of the second planetary gear set RS2 meshes with the sun gear SO2 as well as with the internal gear HO2 of the second planetary gear set RS2 and are rotatably supported on the spider ST2 of the second planetary gear set RS2. On its side which is proximal to the third planetary gear set RS3, the spider ST2 has a spider cover STB2, which extends itself radially outward and on its outside diameter is bound to the internal gear HO3 of the third planetary gear set RS3, in this case, for example, by a welded connection. Obviously this connection can be made in another embodiment as form-fit, or also the spider cover STB2 and the internal gear HO3 can be made in one piece construction.

The internal gear HO2 of the second planetary gear set RS2, by means of the output element 530 of the clutch E, is connected to spider ST1 of the first planetary gear set RS1. This output element 530 is designed as a cylinder, which extends itself axially from the internal gear HO1 of the first planetary gear set RS1 up to the internal gear HO2 of the second planetary gear set RS2, and thereby takes over the clutch E in the axial direction. On its inside diameter, this cylinder possesses a come-along profile for the acceptance of the outer disks of the disks packet 500 of the clutch E. The one piece construction shown in FIG. 4b as an example of internal gear HO2 and the output element 530, is, as far as assembly is concerned, very advantageous. Designed as a thin walled steel component, such a construction of the output element 530 also enables arrangement of the disks packet 500 of the clutch E to be given a relatively greater diameter. Obviously, the internal gear HO2 and the output element 530 can be made as separate components. On its side which is proximal to the second planetary gear set RS2, the spider ST1 of the first planetary gear set RS1 has a second spider plate STB12, which is supported on the input drive shaft AN and extends itself radially to the outside up to the output element 530 of the clutch E. On its outer diameter, the second spider cover possesses a come-along profile, engages in a complementary come-along profile of the output element 530 of the clutch E. In the interests of manufacturing technology, in an advantageous manner, this form-fit connection can be so constructed, that the spider cover STB12 engages in the come-along profile of the output element 530 for the outer disks of the clutch E.

The spider ST3 of the third planetary gear set RS3 is connected both with the output drive shaft AB and with the internal gear HO1 of the first planetary gear set RS1. As a connective element between the internal gear HO1 and the spider ST3 is provided a thin walled cylinder ZYL, which extends itself, seen in the axial direction, above the clutch E and the two planetary gear sets RS2, RS3. This extension proceeds out of the internal gear HO1 up to beyond the internal gear HO3 of the third planetary gear set RS3. The cylinder ZYL also completely overlaps both the clutch E as well as the two planetary gear set RS2, RS3. In the depiction of FIG. 4b is shown the cylinder ZYL welded to the internal gear HO1. However, it is also possible that the desired connection can be made otherwise, perhaps form fit with the internal gear HO1. On its other side, the cylinder ZYL is bound by a come-along profile with a spider cover STB3 of the spider ST3, which is placed on that side of the third planetary gear set RS3, which is remote from the planetary gear set RS2. Obviously, even this connection between the spider ST3 and the cylinder ZYL can be, with good design, otherwise arranged, for instance, as a welded connection. The output drive shaft AB is on that side of the third planetary gear set RS3, which side is proximal to the second planetary gear set RS2, and said shaft is bound to the spider ST3. In this way, the output drive shaft AB completely centrally penetrates the sun gear SO3 of the third planetary gear set RS3 and is bearingly supported on the input drive shaft AN. In the present example, the output drive shaft AB and the input drive shaft AN are shown in one piece as a forged component, which is connected form-fit on that side of the third planetary gear set RS3 which is remote from the second planetary gear set RS2. In this way, the output drive shaft AB completely, centrally penetrates the third planetary gear set RS3 and is bearingly supported on the input drive shaft AN. In the present example, the output drive shaft AB and the spider ST3 are made as a one-piece, forged unit. This forged unit is form-fit on that side of the third planetary gear set RS3, which is remote from the second planetary gear set RS2 with an output drive flange ABF. This arrangement provides seating with a larger bearing base on the output side outer wall of the transmission housing GG.

On the outside diameter of the spider cover STB3 of the third planetary gear set RS3 is to be found an additional parking blockage wheel PSR and is securely bound therewith, for example the connection can be by welding or forging. In a known manner this park-blocking wheel PSR possesses a toothing, in which a (in FIG. 4b shown simplified) parking blocker linkage PSK can engage for the securement of the output drive shaft AB. For the measurement of the rate of rotation and/or direction of rotation of the output drive shaft AB, on the outer surface of the cylinder ZYL is provided a corresponding contour, which contacts a complementary, tachometer NAB radially but without touching. In another embodiment, the output drive shaft or the output drive direction of rotation can also be measured by the parking blocker. Obviously, it is possible that even two output sensors of speed of rotation of this kind, or even one of two output sensors, could be provided as combination output shaft speed of rotation, in order to determine the absolute speed of rotation of the output drive shaft AB as well as the direction of rotation.

The sun gear SDO3 of the third planetary gear set RS3 is bearingly supported on the output drive shaft AB and on that side of the third planetary gear set RS3 which is remote from the second planetary gear set RS2 and connected with the input element 120 of the brake A, in the presented illustration by means of a welded connection. In another embodiment, the input element 120 of the brake A can be also engaged in a come-along profile of the sun gear SO3. The entry element 120, presented here as an open steel container open in the direction of the transmission output side, possesses on its cylindrical section 121 a come-along profile for the acceptance of friction disks of the disks packet 100 of the brake A. Concerned with this the disks packet 100 is to be found on an relatively large diameter, spatially observed, to be next to the internal gear HO3 of the third planet gear set RS3. The transmission housing GG has in this zone, a come-along profile for the acceptance of outer disks of the disks packet 100 of the brake A, but also takes over at the same time the function of an outside disks carrier for the brake A, thus providing an advantage in manufacture and assembly. Obviously, it is possible that, in another embodiment, even a separate outside disks carrier can be provided for the brake A, which then, by means of appropriate means, would be affixed to the transmission housing.

The servo apparatus of the brake A is in an advantageous manufacturing as well as assembly-technologic manner likewise directly integrated in the transmission housing. To this purpose the output side outer wall of the transmission housing GG possesses a corresponding piston and pressure space 111, as well as complementary pressure medium channels 118 for this pressure space 111. In this piston space is slidably placed a pressure reactive piston 114 of the servo apparatus of the brake A. In the case of a pressure application within the pressure space 111, this piston activates the disks 100 of the brake A, counter to the opposing force of a restoring element 113 (in this depicted case, the opposing force is generated by a plate spring) axially in the direction of the third planet gear set RS3. In another embodiment provision can also be made, that the power take-off side of the outer wall of the transmission housing can be made separately along with the transmission housing cover, which, for example, is both the servo apparatus of the brake A as well as being able to pick up the outside disks of the brake A.

The constructed transmission is outlined completely in FIGS. 4a, 4b. These Figures also characterize themselves by presenting a reduced number of axial bearings and rotating sealing rings. In an especially advantageous manner, there are eight axial bearings provided, these being designated as AX1 to AX8 and they appear in two different sizes. Further, altogether there are only four designated as RR1 to RR4 rotating sealing rings (square rings) necessary, in order that the individual pressure and lubrication media channeling are sealed from one another and from the outside. All four rotating sealing rings RR1 to RR4 are inserted into corresponding grooves of the input drive shaft AN and can, in an advantageous manner, be geometrically the same.

Figure 6:
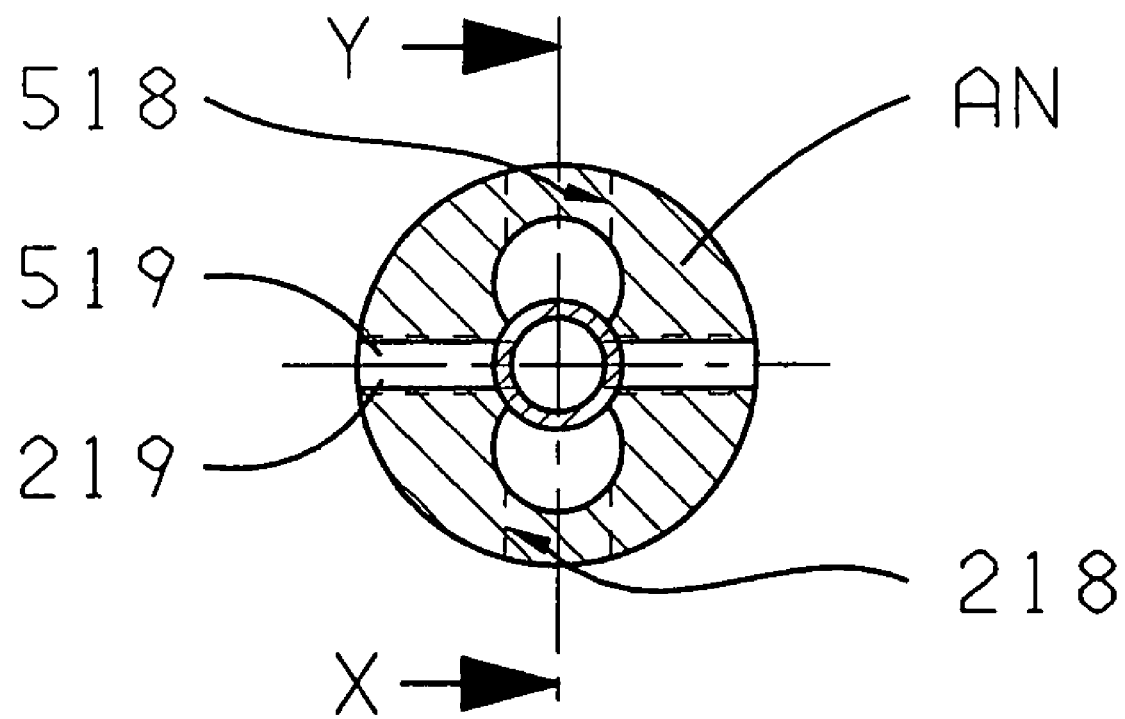
FIG. 6 is a section through an input drive shaft.

For the clarification of the pressure means and the lubricating medium, within the input drive shaft AN for the supply of the pressure and pressure compensation spaces of the two clutches B and E and for the lubrication of various transmission elements, FIG. 6 shows a section through the input drive shaft AN, which is designated in the FIGS. 4a, 4b with X-Y. A thin walled tube ROH is inserted centrally in the input drive shaft AN with oil tight sealing. This insertion would normally be done by press-fitting or an adhesive joining. With this tube ROH the lubrication means is conducted, which lubrication is distributed by means of the radial borings which open into the interior of the tube ROH for branching the lubrication of diverse components and for the filling of the pressure compensation space. In FIG. 6, above the horizontal center line, there is visible a boring 519 through the input drive shaft AN for the conducting of lubrication means to the pressure compensation space of the fifth shifting element E. In this axial boring of the input drive shaft AN above the tube ROH the pressure medium for the servo apparatus of the fifth shifting element E is led. In this axial boring opens the radial boring of the pressure medium feed 518 to the pressure space of the fifth shifting element E, which is here indicated by a dotted line, because, in this sectional drawing, it would otherwise be invisible.

Furthermore, in the section of FIG. 6, underneath, as we look at the illustration, the horizontal center line, is to be found a radially penetrating boring 219 proceeding through input drive shaft AN, for the lubrication means flow to the pressure compensation space of the second shifting element B. Again underneath this said centerline, presented in dotted line, is the (also in this view invisible) radial boring of the lubrication feed to the pressure compensation space of the fifth shifting element E. In the axial boring of the input drive shaft AN, below the tube ROH is conducted the pressure medium for servo apparatus of the second shifting element B. In this axial boring, opens the pressure medium feed 218 to the pressure space of the second shifting element B, which is here presented again in dotted line, because, again, in this section it would be invisible.

Now going to FIG. 7, a second, schematic assembly of components will be explained and described. In this respect, this second component assembly relies on the previously described first component assembly as explained for FIG. 3, with an unchanged kinematic coupling of the three single planet gear sets RS1, RS2, RS3, with the five shifting elements A to E along with the input drive shaft and the output drive shaft still designated with AN and AB respectively. The arrangement of the input drive shaft AN, the output drive shaft AB, the three planet gear sets RS1, RS2, RS3, the clutch E as the fifth shifting element, as well as the brake A as the first shifting element, corresponds essentially to that as shown in FIG. 3. The differences in the arrangement lie essentially in the bearing support of the servo apparatus 510 of the clutch E and the bearing support of the input drive shaft AN on the output drive shaft AB in the zone of the third planet gear set RS3. In comparison with FIG. 3, in FIG. 7, the servo apparatus 510 of the clutch E is supported directly on the input drive shaft AN. Further, the input drive shaft AN, which is in a correspondingly designed recess within the output drive shaft AB extends itself in the axial direction now only up to (but not to below) the sun gear SO3 of the third planet gear set SR3.

Figure 7:
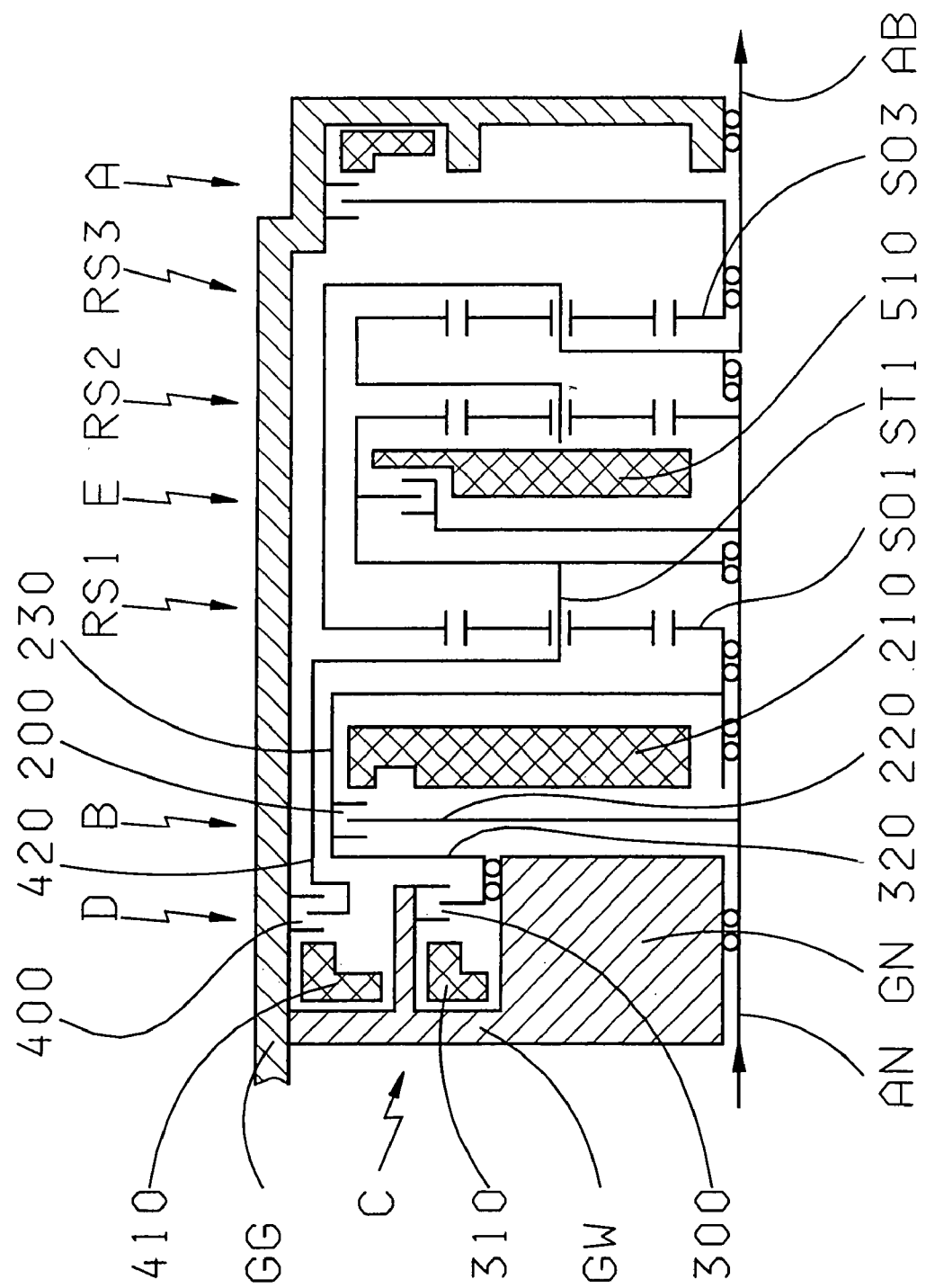
FIG. 7 is an exemplary second schematic component assembly in accord with the invention.

As may further be seen in FIG. 7, the spatial arrangement of the second shifting element B, which is designed as a clutch and the brake-designed third and fourth shifting elements C, D, on the (not shown) drive motor side of the first planet gear set RS1, have been modified in comparison to FIG. 3, especially the spatial arrangement of the disks packet 400 of the brake D. As compared to FIG. 3, there remains unchanged the arrangement of the disks 300 and the servo apparatus 310 of the brake C, as seen in the axial direction above the hub GN of the housing wall GW of the affixed transmission housing GG, the complete integration of the servo apparatus 310 of the brake C in the housing wall GW, the integration of the servo apparatus 410 of the brake D in the housing wall GW, as well as the activation devices of all three servo apparatuses 210, 310, 410 of the respective shifting elements B, C, D.

The clutch B is now—as seen in the direction of the first planet gear set RS1—axially completely placed next to the brake C, especially axial beside the disks 300 of the brake C. The input element 220 of the clutch B is, in this matter, serving as an inner disks carrier and borders the zone, wherein it is attached to the input drive shaft AN, directly at the housing wall GW. The output element 230 of the clutch B is—similar to FIG. 3—designed as a cylindrical outside disks carrier, within which are placed the disks packet 200 and the servo apparatus 210 of the clutch B.

In correspondence with kinematic connection, the input element 320 of the brake C—again as in FIG. 3—is connected to the sun gear SO1 of the first planet gear set RS1 by means of the output element 230 of the clutch B. The input element 320 is designed as an inner disks carrier, now bearing-supported on hub GN of the housing wall GW and now takes friction disks of the disks packet 300 by an inner diameter corresponding to this friction disks. A corresponding outside disks carrier of the brake C for the acceptance of the outside disks of the disks packet 300 at their outside diameter is integrated in housing wall GW which wall is secured in the transmission housing GG, on a diameter greater than that of the servo apparatus 310 of the brake C, but smaller than the diameter of servo apparatus 410 of the brake D. Obviously, the outer disks carrier of the brake C can also be made as a separate, transmission housing secure, component.

The disks packet 400 of the brake D is now, as seen in the axial direction, is placed, at least considerably above the disks packet 300 of the brake C, axially bordering on the servo apparatus 410, which servo apparatus is integrated in the housing wall GW. The transmission housing GG takes over, in the presented embodiment, the function of an outside disks carrier for the brake D. Obviously, it is possible that the outside disks carrier of the brake D can also be designed as a separate, integral part, in the transmission housing. The input element 420 of the brake DE is designed as an inner disks carrier, which correspondingly is connected by kinematic binding with the spider ST1 of the first planet gear set RS1. In this particular assembly, this inner disks carrier completely overlaps the clutch B in the axial direction. Seen spatially, the clutch B is thus not closer to the first planet gear set RS1 than is the brake C, but rather much nearer to the first planet gear set RS1 than is the brake D.

Built as a thin wall, sheet steel component, the inner disks carrier 420 does not disadvantage the brake D by invading the available space therefore to any significant amount. Insofar as the available radial operational space permits for the transmission housing GG, the diameter of the disks 400 of the conceptually, highly stressed brake D is enlarged in a simple way as compared to FIG. 3, to the advantage of obtaining a constructive length reduction.

Figure 8:
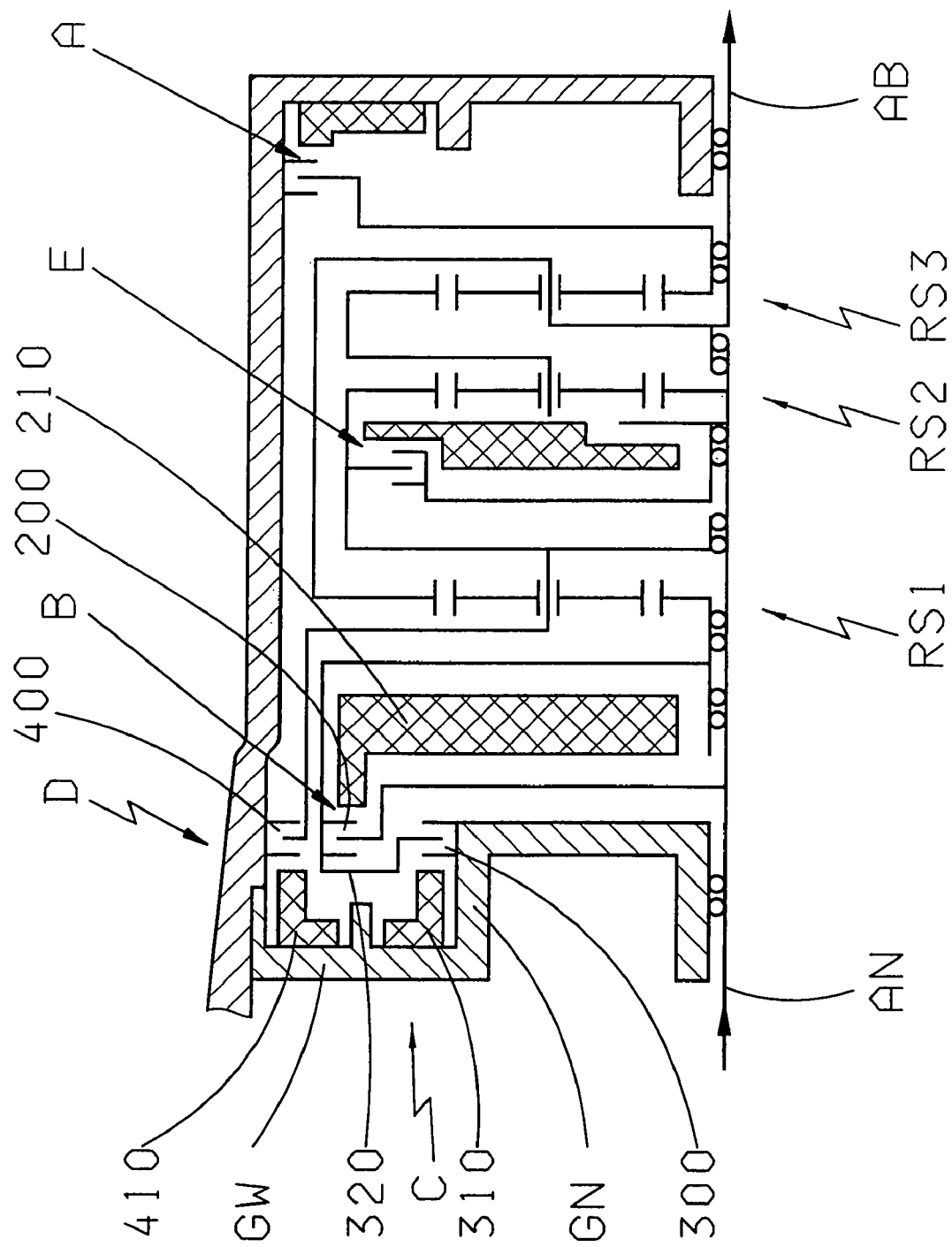
FIG. 8 is a demonstrational third schematic component assembly in accord with the invention.

Referring now to FIG. 8, in the following, a third embodiment of the invention is illustrated as a schematic assembly of components. The third invented assembly of the components rests upon, as will be described, those arrangements previously presented in FIGS. 3 and 7. The kinematic coupling of the three single planet gear sets RS1, RS2, RS3 with one another, with the five shifting element A to E, as well as with the input drive shaft AN and the output drive shaft AB are all taken over without change from the FIG. 3. The assembly of the input drive shaft AN, output drive shaft AB, the three planet gear sets RS1, RS2, RS3, the clutch E as a fifth shifting element as well as the brake A as a first shifting element follows, essentially, those relationships presented in FIG. 3, whereby a detailed difference hereto is undertaken by the bearing support of the input drive shaft AN on the output drive shaft AB in the zone of the third planet gear set RS3 of FIG. 7.

As may be seen in FIG. 8 and unlike the situation in FIG. 3, all three disks packs 200, 300, 400 of the second, third and fourth shifting elements B, C, D border axially on the transmission housing wall GW which is an equipped part of the transmission housing and carries the servo apparatuses 310, 410 of the third and fourth shifting elements C, D. In comparison to FIG. 3, the following remain unchanged: the arrangement of the disks 300 and the servo apparatus 310 of the brake C, as seen in axial direction, radially above hub GN of the housing wall GW; the arrangement of the disks 200 of the clutch B, seen in the axial direction, radially above the disks 300 of the brake C; the design of the input element 320 of the brake C as a friction disks carrier; the arrangement of the servo apparatus 410 of the brake D, radially above the servo apparatus 310 of the brake C; as well as the activation direction of all three servo apparatuses 210, 310, 410 of the three shifting element B, C, D. The disks 400 of the brake D are now, when seen in the axial direction, above the disks 200 of the clutch B.

Taking consideration of the disks diameter as compared with the embodiment of the invention illustrated in FIG. 3, allowing unchanged dimensioning of the disks 300 and 200 of, respectively, brake C and clutch B, a proposed assembly of the disks packet 400 of the brake D, located above the disks packet 200 of the clutch B, as shown in FIG. 8, achieves a shorter constructed length of the transmission, especially considering the fact that the brake D, as planned, is the statically highest stressed shifting element of this automatic transmission. The proximity to the drive motor of the three shifting elements C, B, D, as seen spatially, over one another, is advantageous for the usual installation of an automatic transmission in a motor vehicle with a standard drive. For example, the driving motor proximal area of the transmission installation location, (i.e., "transmission tunnel) is known to be relatively large, and, as it runs in the direction of the output drive, is generally tapered.

Figure 9:
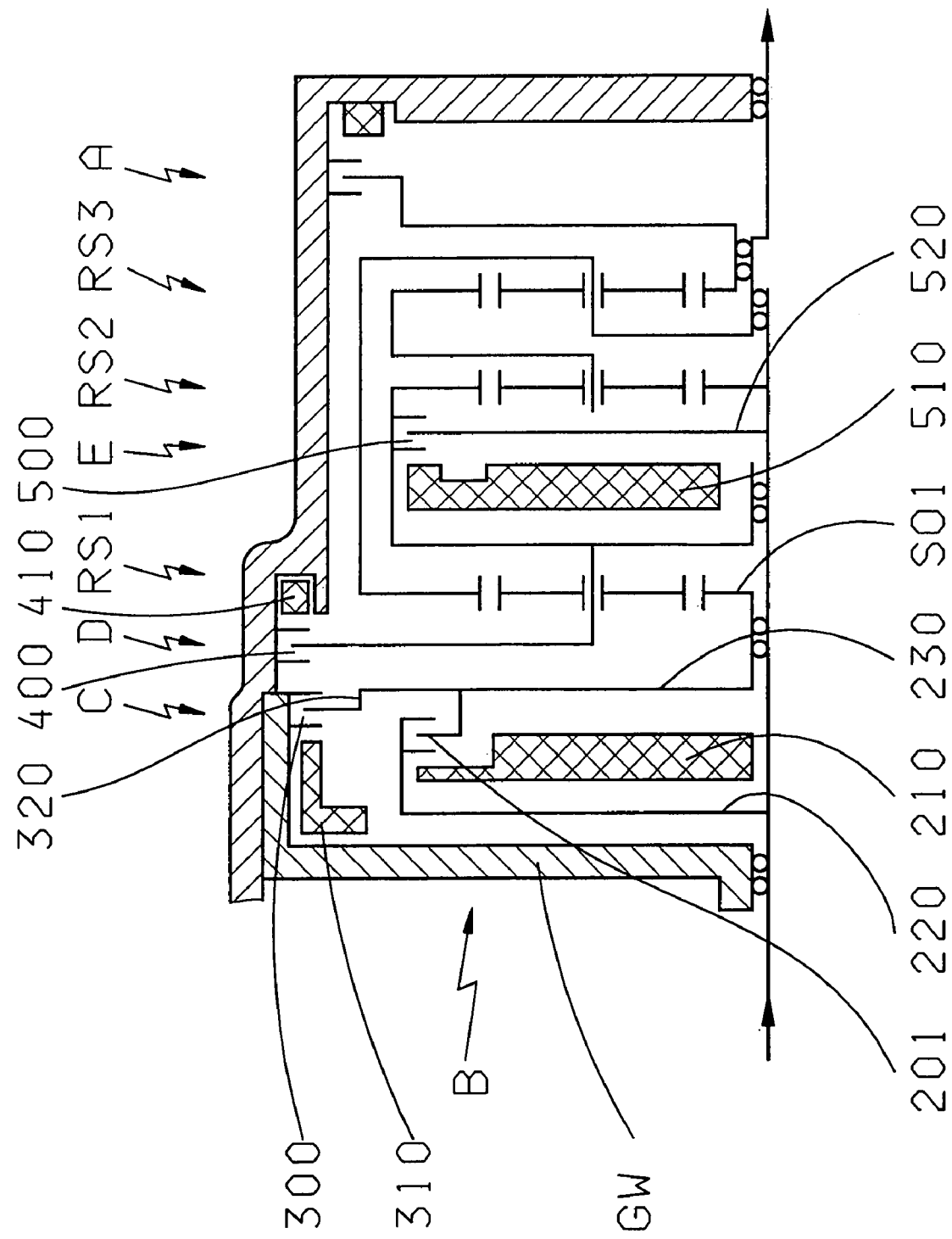
FIG. 9 is an exemplary fourth schematic component assembly in accord with the invention.

FIG. 9 illustrates a fourth embodiment of the invention as a schematic component assembly. In this arrangement, as described FIG. 3, with unchanged kinematic coupling of the three single planetary gear sets RS1, RS2, RS3 with one another, with the five shifting elements A to E as well as with the input drive shaft and the output drive shafts AN, AB. The arrangement of the input drive shaft AN, output drive shaft AB, the three planetary gear sets RS1, RS2, RS3, the clutch E as the fifth shifting element, as well as the brake A as the first shifting element, corresponds essentially to the arrangements of FIG. 3, whereby, as a difference in detail to FIG. 3, the servo apparatus is not located axially between the input element 520 of the clutch E and the second planetary gear set RS2, but is situated axially between the first planetary gear set RS1 and the input element 520 of the clutch E. Correspondingly reversed is the activation direction of the of the servo apparatus 510, which activates the disks 500 of the clutch E now axially in the direction of the second planetary gear set RS2.

Again as in FIG. 3, the disks 400 of the brake D are placed on that side of the first planetary gear set RS1 which is remote from the second planetary gear set RS2, and axially bordering on—and radially above—the first planetary gear set RS1. The servo apparatus 410 of the brake D is now placed above the first planetary gear set RS1, integrated in the transmission housing GG and activates the disks 400 of the brake D in the direction of the housing wall GW.

The brake C borders on the housing wall GW in the direction of the transmission housing-interior space, whereby, integrated into the housing wall GW are the servo apparatus 310 of the brake C as well as the outside disks carrier for the reception of outside disks of the disks packet 300 of the brake C, this taking place on a great diameter proximal to an interior diameter of the transmission housing GG. The housing wall GW forms, a coupling space for the brake C. The brake C is at least partially housed within this coupling space of the brake C. The input element 220 of the clutch B is designed as an outside disks carrier, and geometrically as a container, open in the direction of the first planetary gear set RS1, the disk shaped bottom of which borders directly on the housing wall GW and is bound to the input drive shaft AN. Inside the cylindrical section thereof, the disks packet 200 and the servo apparatus 210 of the clutch B are placed. The servo apparatus 210, which rotates always with the speed of rotation of the input drive shaft AN, is bearingly supported on the input drive shaft AN and activates the disks 200 axially in the direction of the first planetary gear set RS1. In the embodiment example presented in FIG. 9, the disks 200 of the clutch B, spatially observed, are placed largely underneath the disks 300 of brake C. In accord with the thermally differed stress of the clutch B and the brake C, it is possible that the disks packet 200 of the clutch B can even extend farther axially in the direction of the first planetary gear set RS1 than does the disks packet 300 of the brake C.

In the example shown in FIG. 9, the output element 230 of the clutch B and the input element 320 of the brake C are both designed as inner disks carriers. In this arrangement, the inner disks carrier 320 of the brake C is above the inner disks carrier 230 of the clutch B which is connected with the sun gear SO1 of the first planetary gear set RS1. In FIG. 9, the inner disks carrier 230 of the clutch B is so designed, that it picks up the friction disks of the friction disks packet 200 at their inner diameter. If, for example, a one-piece manufacture of the inner disks carrier 230, 320 of clutch B and brake C is provided, then it can be of advantage, if the inner disks carrier of the clutch B—exclusive of the presentation of the FIG. 9—is so designed, that it picks up the frictional disks of the clutch B on the basis of their outer diameter. In this case, the servo apparatus of the clutch B is advantageously then on that side of the disks of the clutch B which are proximal to first planetary gear set RS1, and thus activates these disks in the direction of the housing wall GW, which direction is also contrary to the direction to the first planetary gear set RS1.

Figure 10:
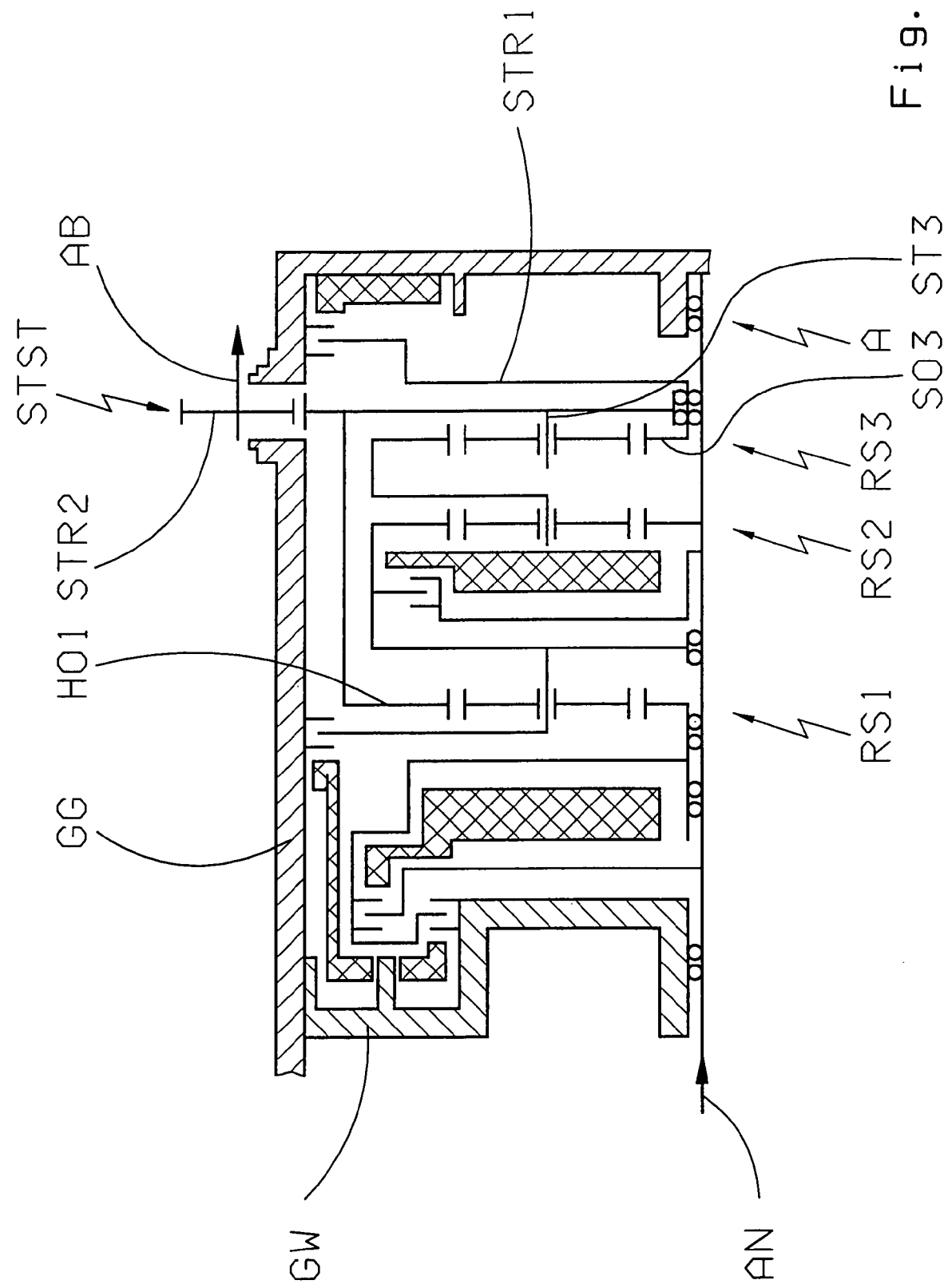
FIG. 10 is as an example, a first schematic component assembly with a non-coaxial arrangement of the input and the output drive shafts, on the basis of the schematic component assembly of FIG. 3.

As previously described, the transmission scheme outlined in FIG. 3, in regard to the assembly of input drive and output drive shafts relative to one another is to be looked upon as exemplary. FIG. 10 illustrates further embodiment of the invention in accord with FIG. 3. In this embodiment, however, with non-coaxial alignment of the input and output drive shafts. Starting with the component arrangement as proposed by FIG. 3, the input drive shaft AN and the output drive shaft AB are now axis-parallel to one another. For the kinematic connection of the output drive shaft AB to the internal gear HO1 of the first planetary gear set RS1, which internal gear is continually, in this case, connected with the spider ST3 of the third planetary gear set RS3, a spur gear stage STSF is provided, which seen spatially, is located on that side of the third planetary gear set RS3 which is oppositely situated to the second planetary gear set RS2 and is axially aligned between the third planetary gear set RS3 and the clutch A. In this case, a first spur gear STR1 of this spur gear stage STST is tight connected with the spider ST3 of the third planetary gear set RS3 and, for example, is connected with the sun gear SO3 of the third planetary gear set RS3. A second spur gear STR2 of this spur gear stage STST meshes with the first spur gear STR1 and is fast fastened to the output drive shaft AB. Obviously, instead of the two-gear spur gear stage, it is possible here to install a multi-gear stage, for instance with three spur gears and then again with the same direction of rotation of the input drive shaft and the output drive shaft.

In a similar manner, it may be seen in FIG. 10 the input drive shaft centrally penetrates housing wall GW and all the three planetary gear sets RS1, RS2, RS3 and find bearing on the cover shaped outside wall of the transmission housing GG. The drive motor, which is not shown, of the automatic transmission is also on that side of the housing wall GW, which side is remote from the planetary gear sets RS1. RS2, RS3. It can be readily appreciated that the input drive shaft also penetrates the coverlike outer wall of the transmission housing GG, which outer wall lies opposite to the housing wall GW and the drive motor can be placed correspondingly proximal to the clutch A on this side of the transmission.

Figure 11:
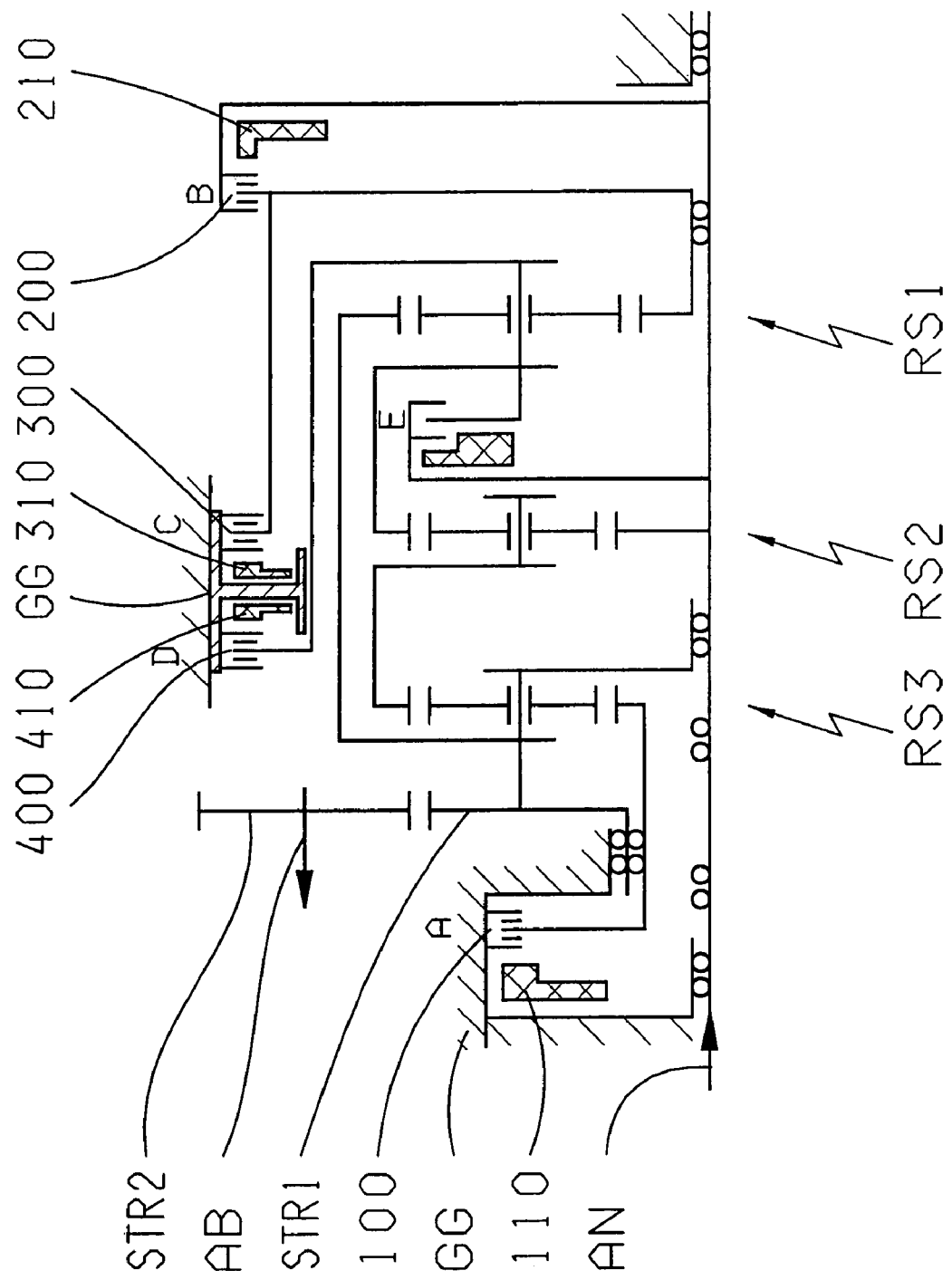
FIG. 11 is as an example, a second schematic component assembly with a non-coaxial arrangement of the input and output drive shafts.

FIG. 11 shows a further embodiment of the invention, with input drive shaft AN and output drive shaft AB arranged axis-parallel to one another. Differing from the previously described embodiment, the two brakes C, D, are no longer spatially seen beside the first planetary gear set RS1, but are now found beside one another in a zone above the planetary gear sets. This, as shown, is a zone above planetary gear sets RS2 and RS3, upon a large diameter approaching the inside diameter of the transmission housing GG. The servo apparatus 210, which, unchanged, is located on that side of the first planetary gear set RS1 which is remote from the second planetary gear set RS2. The clutch B of the first planetary gear set RS1 activates the disks 200 now axially in the direction of the first planetary gear set RS1. The brake C is placed nearer to the clutch B than is the brake D, both relative to the same disks packet as also to the respective servo apparatus. In the presented example, the disks packet 300 of the brake C, when seen in the axial direction, is placed predominately radially above the second planetary gear set RS2. The servo apparatus 310 of the brake C activates the disks 300 of the brake C in the direction of the clutch B. The brake D connects itself onto the brake C in the direction of the spur drive. The disks 400 of the brake D, in the illustrated example, are installed in a zone above the second and third planetary gear sets RS2, RS3. The servo apparatus 410 activates the disks 400 in the opposite direction to the brake C, that is, toward the clutch B. As this occurs, the servo apparatuses 310 and 410 of the two brakes C, D are directly neighboring, so that they are integrated here, in a favorable and advantageous outside disks carrier, which takes up the outside disks of both disks packets 300 and 400. Advantageously, the disks 300 and 400 have equal diameters (component sharing concept).

In yet another embodiment of the invention, the transmission housing GG in this section possesses an adaptable come-along profile for the acceptance of the outside disks of the disks packets 300 in the brake C and/or the outside disks of the disks packet 400 of the brake D.

Again, it may easily be seen, that the arrangement of the two adjacent brakes C, D, shown in the axial direction of the presentation in FIG. 11, deviate in the intervening space between the second spur gear STR2 of the spur drive and the disks packet 200 of the clutch B.

Since the input drive shaft AN of the automatic transmission centrally penetrates completely in the axial direction, in FIG. 11, the drive motor (not shown) which is operationally connected with input drive shaft AN, which is placed, for example, at that side of the third planetary gear set RS3 which is remote from the second planetary gear set RS2, thus being on the transmission side on which the brake A and that spur drive stage which is operationally connected to output drive shaft AB, thus on the transmission side opposite to the clutch B. In such a case, then, the brake A borders on that outer wall of the transmission housing GG which is proximal to the drive motor. The outer wall can also be designed as a housing cover.

Figure 12:
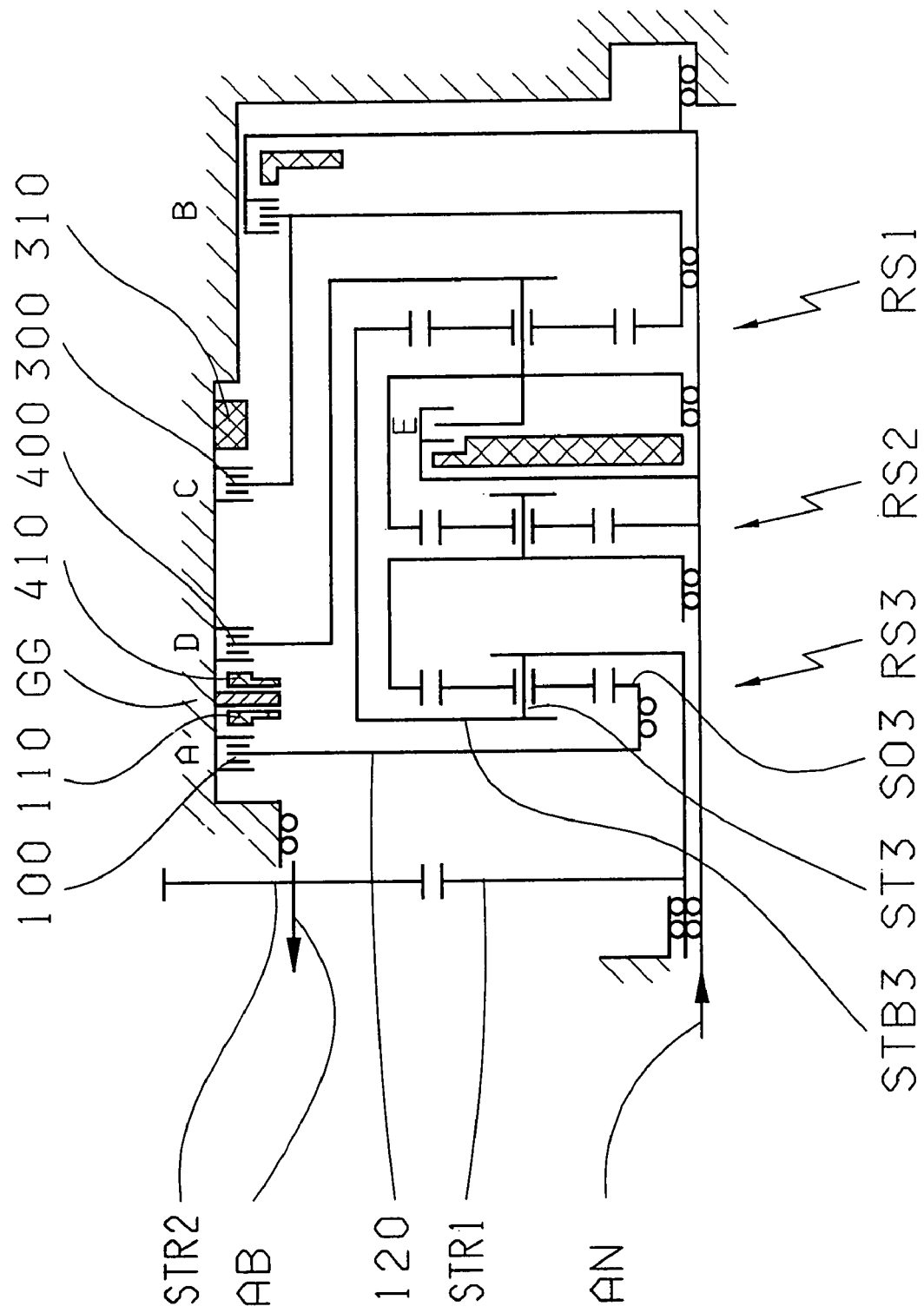
FIG. 12 is an exemplary third schematic component assembly with a non-coaxial arrangement of the input and output drive shafts.

Progressing now to FIG. 12, a further embodiment of the invention is shown with axis-parallel drive shafts for input and for output, namely, respectively, AN and AB.

In contrast to FIG. 11, in this case, the brakes A, C and D are assembled next to one another within the inside diameter of the transmission housing GG. In this case, the brake A connects axially in the direction of the spur gear drive to the brake D. Advantageously, the disks 100, 300 and 400 of the three brakes A, C, D have the same diameter, thus conforming to the practice of conforming components. Similarly to the case of the brakes C and D in FIG. 11, in FIG. 12 we see the brakes A and D coalesced as a component-group. The servo apparatus 110, 410 of both brakes A, D, are installed directly proximal to one another. The servo apparatus 410 of the brake D is on that side of the disks packet 400 of the brake D, which is remote from the brake C in the direction of the clutch B. The servo apparatus 110 of the brake A is on that side of the disks packet 100 of the brake A which is proximal to the brake D. The servo apparatus 110 activates these disks 100 axial in a contrary direction to the brake D (or clutch B).

In FIG. 12, the spider cover, which is remote from the second planetary gear set RS2, of the spider ST3 of the of the third planetary gear set RS3, is designated as STB3. Axially and directly bordering on this spider cover STB3 extends the input element 120 of the brake A (inner disks carrier), which is connected to the sun gear of the third planetary gear set RS3. The extension continues radially outward. On the side of the input element 120 of the brake A (inner disks carrier) opposite to the spider cover STB, once more the spur gear stage, which is operationally connected to the output drive shaft AB, makes connection with the two spur gears STR1 and STR2. A hub of the first spur gear STR1 is bearingly supported on the input drive shaft AN and centrally penetrates the input element 120 of the brake A and likewise penetrates the sun gear of the third planetary gear set RS3. The hub is connected with the spider ST3 on that side thereof which is proximal to the second planetary gear set RS2. The spur gear stage is thus directly placed on an outer wall of the transmission housing GG. Accordingly, the bearing-placement of the first spur gear STR1 can be carried out correspondingly steeply in relation to the outer wall. In the presented illustration, this is shown being carried out on a corresponding cylindrical projection of the outer wall. Obviously, this outer wall can also be formed as a housing cover. In that presentation given in FIG. 12, the example shows the spur gear stage at the side of the automatic transmission housing GG which is proximal to drive motor. In this way, the input drive shaft AN centrally penetrates the hub of the first spur gear STR1 and the hubs of the first spur gear STR1 additionally are bearingly supported on the input drive shaft AN.

Further modifications can adapt the multistage transmission of the present invention to other configurations of the motor vehicle input drive string, such an angular placement of the drive shafts of the input and the output of the automatic transmission, for example, by the addition of a bevel gear drive instead of the previously described spur gear stage for a front-drive with a drive motor aligned to be longitudinally placed relative to the direction of travel.

As described previously, the transmission schematics shown in FIG. 3 and in FIGS. 7 to 12, are to be considered both for the invented coupling of the planetary gear sets to each other and their connection to the shifting elements as well as to the drive shafts for input and output, i.e. AN and AB of the automatic transmission. FIG. 13 now shows in turn, an exemplary embodiment of the schematic component assembly as it was pictured in FIG. 3. Now described is a modified coupling of the individual planetary gear set elements, whereby this kinematic coupling of the planetary gear set elements is already disclosed by DE 199 12 480 A1. In contrast to FIG. 3, the internal gear HO1 of the first planetary gear set RS1 and the spider ST2 of the second planetary gear set RS2 and the output drive shaft AB are continually bound to one another. This continual binding is true, as long as the spider ST3 of the third planetary gear set RS3 is continually engaged with the internal gear HO2 of the second planetary gear set RS2 and the spider ST1 of the first planetary gear set RS1 is continually engaged with the internal gear HO3 of the third planetary gear set RS3. Otherwise, the kinematic coupling of the three single planetary gear sets RS1, RS2, RS3 on the five shifting elements A to E and on the input drive shaft remains unchanged as compared to FIG. 3. Also, the spatial arrangement of the five shifting elements A to E relative to one another and to the three planetary gear sets RS1, RS2, RS3 has not been changed from that of FIG. 3.

The modifications to FIG. 3, as described and illustrated in FIG. 13, can be likewise applied to the embodiments illustrated in FIGS. 7 to 12.

The schematic component assemblies depicted in FIG. 3 and in FIGS. 7 to 13, as well as those shown in FIGS. 41, 4b, show advantageously designed transmission constructions treating disks brakes as an acceptable solution for shifting elements intended to serve as brakes. Principally, one or all disks brakes can be replaced by band centered brakes. In the non-shifted condition, band brakes, where slippage movement is concerned, are known to be more reliable than disks brakes. For all shown component assemblies, in the second to the sixth forward gear, non-shifted brake D and/or the in the fifth and sixth forward gear as well as in the reverse gear the non shifted brake A can be rendered as band brakes.

| | Reference Numbers and Corresponding Parts |
|---|---|
| A | first shifting element, a brake |
| B | second shifting element, a clutch |
| C | third shifting element, a brake |
| D | fourth shifting element, a brake |
| E | fifth shifting element, a clutch |
| AN | input drive shaft |
| AB | output drive shaft |
| GG | housing for the transmission |
| GW | wall of housing for the transmission |
| GN | hub of the housing wall GW |
| GZ | interposed wall of housing |
| ABF | output drive flange |
| NAN | input drive tachometer |
| NAB | output drive tachometer |
| PSK | park-blocker pin |
| PSR | park blocking gear |
| ROH | tube of the input drive shaft |
| ZYL | cylinder |
| AX1 to AX8 | axial bearings |
| RR1 to RR4 | rotating sealing ring |
| STST | spur gear stage |
| STR1 | first spur gear of the spur gear stage |
| STR2 | second spur gear of the spur gear stage |
| RS1 | first planetary gear set |
| HO1 | internal gear of the first planetary gear set RS1 |
| SO1 | sun gear of the first planetary gear set RS1 |
| ST1 | spider of the first planetary gear set RSI |
| PL1 | planet gear of the first planetary gear set RS1 |
| STB11 | first spider cover plate of the first planetary gear set RS1 |
| STB12 | second spider cover plate of the first planetary gear set RS1 |

-continued

| | Reference Numbers and Corresponding Parts |
|---|---|
| RS2 | second planetary gear set |
| HO2 | internal gear of the second planetary gear set RS2 |
| SO2 | sun gear of the second planetary gear set RS2 |
| ST2 | spider of the second planetary gear set RS2 |
| PL2 | planet gear of the second planetary gear set RS2 |
| STB2 | spider cover plate of the second planetary gear set RS2 |
| RS3 | third planetary gear set |
| HO3 | internal gear of the third planetary gear set RS3 |
| SO3 | sun gear of the third planetary gear set RS3 |
| ST3 | spider of the third planetary gear set RS3 |
| PL3 | planet gear of the third planetary gear set RS3 |
| STB3 | spider cover plate of the third planetary gear set RS3 |
| 100 | disks of the first shift element |
| 110 | servo apparatus of the first shifting element |
| 111 | pressure space of the first shifting element |
| 113 | restoration element of the servo apparatus of the first shifting element |
| 114 | piston of the servo apparatus of the first shifting element |
| 118 | pressure medium feed to the pressure space of the first shifting element |
| 120 | Input element of the first shifting element, inner disks carrier |
| 121 | cylindrical section of the input element of the first shifting element |
| 200 | disks of the second shifting element |
| 210 | servo apparatus of the second shifting element |
| 211 | pressure space of the second shifting element |
| 212 | pressure compensation space of the second shifting element |
| 213 | restoration element of the servo apparatus of the second shifting element |
| 214 | piston of the servo apparatus of the second shifting element |
| 215 | "push-plate" of the servo apparatus of the second shifting element |
| 218 | pressure medium feed to the pressure space of the second shifting element |
| 219 | lube medium feed for the compensation space of the second shifting element |
| 220 | input element of the second shifting element |
| 221 | cylindrical section of the in input element of the second shifting element |
| 222 | disk-shaped section of the entry element of the second shifting element |
| 223 | hub of the input element of the second shifting element |
| 230 | first cylindrical section of the output element of the second shifting element |
| 232 | first disk-shaped section of the output of the second shifting element |
| 233 | hub of the output element of the second shifting element |
| 234 | second cylindrical section of the output element of the second shifting element |
| 235 | 2nd disk-shaped section of the output element of the second shifting element |
| 300 | disks of the third shifting element |
| 310 | servo apparatus of the third shifting element |
| 311 | pressure space of the third shifting element |
| 313 | restoration element of the servo apparatus of the third shifting element |
| 314 | piston of the servo apparatus of the third shifting element |
| 318 | pressure medium feed to pressure space of the third shifting element |
| 320 | input element of the third shifting element |
| 321 | cylindrical section of the input element of the third shifting element |
| 322 | disk-shaped section of the input element of the third shifting element |
| 400 | disks of the fourth shifting element |
| 410 | servo apparatus of the fourth shifting element |
| 411 | (single) pressure space of the fourth shifting element |
| 411a | first pressure space of the fourth shifting element |
| 411b | second pressure space of the fourth shifting element |
| 413 | restoration element of the servo apparatus of the fourth shifting element |
| 414 | piston of the servo apparatus of the fourth shifting element |
| 416 | activation stamping of the fourth shifting element |
| 418 | pressure medium feed to the pressure space of the fourth shifting element |
| 420 | input element of the fourth shifting element |

-continued

| | Reference Numbers and Corresponding Parts |
|---|---|
| 421 | cylindrical section of the input element of the fourth shifting element |
| 500 | disks of the fifth shifting element |
| 510 | servo apparatus of the fifth shifting element |
| 511 | pressure space of the fifth shifting element |
| 512 | pressure compensation space of the fifth shifting element |
| 513 | restoration element of the servo apparatus of the fifth shifting element |
| 514 | piston of the servo apparatus of the fifth shifting element |
| 515 | "push-piate" of the servo apparatus of the fifth shifting element |
| 517 | support plate |
| 518 | pressure medium feed to the pressure space of the fifth shifting element |
| 519 | lube feed to the pressure compensation space of the fifth shifting element |
| 520 | input element of the fifth shifting element |
| 521 | cylindrical section of the input element of the fifth shifting element |
| 522 | disk-shaped section of the input element of the fifth shifting element |
| 523 | hub of the input element of the fifth shifting element |
| 530 | output element of the fifth shifting element |

The invention claimed is:

1. A multi-stage automatic transmission comprising:
an input drive shaft (AN), and
an output drive shaft (AB);
only first, second, third, fourth and fifth shifting elements (A to E) with selective engagement of desired ones of the first, the second, the third, the fourth and the fifth shifting elements (A to E) achieves at least six forward gears and at least one reverse gear;
at least first, second and third planetary gear sets (RS1, RS2, RS3) being aligned coaxially with respect to one another with the second planetary gear set (RS2) positioned between the first and the third planetary gear sets (RS1, RS3);
a sun gear (SO3) of the third planetary gear set (RS3) being connectable, by the first shifting element (A), to a transmission housing (GG) of the multi-stage automatic transmission,
a sun gear (SO2) of the second planetary gear set (RS2) being connected with the input drive shaft (AN),
the input drive shaft (AN) being connectable, by the second shifting element (B), with a sun gear (SO1) of the first planetary gear set (RS1) and the input drive shaft (AN) also being connectable, by the fifth shifting element (E), with a spider (ST1) of the first planetary gear set (RS1);
the sun gear (SO1) of the first planetary gear set (RS1) being connectable, by the third shifting element (C), to the transmission housing (GG) and the spider (ST1) of the first planetary gear set (RS1) being connectable, via the fourth shifting element (D), to the transmission housing (GG); and
the output drive shaft (AB) being connected with the spider (ST2, ST3), of one of the second and the third planetary gear sets (RS2, RS3), and also with an internal gear (HO1) of the first planetary gear set (RS1); and
only one shaft extending axially through at least one of the first planetary gear set (RS1) and the second planetary gear set (RS2).

2. The multi-stage automatic transmission according to claim 1, wherein the one shaft, which extends axially through at least one of the first and the second planetary gear sets (RS1, RS2), is the input drive shaft (AN).

3. The multi-stage automatic transmission according to claim 1, wherein the fifth shifting element (E) is positioned axially between the first and the second planetary gear set (RS1, RS2).

4. The multi-stage automatic transmission according to claim 1, wherein a connective element, between the spider (ST1) of the first planetary gear set (RS1) and the internal gear (HO2) of the second planetary gear set (RS2), is a disk carrier of the fifth shifting element (E).

5. The multi-stage automatic transmission according to claim 1, wherein a combining element, between the spider (ST1) of the first planetary gear set (RS1) and the internal gear (HO2) of the second planetary gear set (RS2), is an outer disk carrier for supporting friction disks of the fifth shifting element (E).

6. The multi-stage automatic transmission according to claim 1, wherein the second shifting element (B) is located on a side of the first planetary gear set (RS1) opposite to the fifth shifting element (E).

7. The multi-stage automatic transmission according to claim 1, wherein the third and the fourth shifting elements (C, D) are located on a side of the first planetary gear set (RS1) opposite the fifth shifting element (E).

8. The multi-stage automatic transmission according to claim 1, wherein the second, the third and the fourth shifting elements (B, C, D) are placed on one side of the first planetary gear set (RS1) proximate to a motor of the multi-stage automatic transmission, which is operationally connected to the input drive shaft (AN).

9. The multi-stage automatic transmission according to claim 1, wherein the third and the fourth shifting elements (C, D) are axially adjacent one another and are in a zone radially outside the first, the second and the third planetary gear sets (RS1, RS2, RS3).

10. The multi-stage automatic transmission according to claim 1, wherein a servo apparatus (510), for the fifth shifting element (E), is located on the input drive shaft (AN), and the input drive shaft (AN) axially penetrates completely through the first planetary gear set (RS1).

11. The multi-stage automatic transmission according to claim 1, wherein a servo apparatus (510), for the fifth shifting element (E), activates disks (500) of the fifth shifting element (E) axially in a direction of the first planetary gear set (RS1).

12. The multi-stage automatic transmission according to claim 1, wherein a servo apparatus (510), for the fifth shifting element (E), activates disks (500) of the fifth shifting element (E) axially in a direction of the second planetary gear set (RS2).

13. The multi-stage automatic transmission according to claim 1, wherein a servo apparatus (210), for the second shifting element (B), is located closer to the first planetary gear set (RS1) than a servo apparatus (310) for the third shifting element (C).

14. The multi-stage automatic transmission according to claim 1, wherein a servo apparatus (210) of the second shifting element (B) is placed immediately proximate the first planetary gear set (RS1).

15. The multi-stage automatic transmission according to claim 1, wherein a servo apparatus (210) of the second shifting element (B) axially activates disks (200) of a second shifting element (210) in a direction away from the first planetary gear set (RS1).

16. The multi-stage automatic transmission according to claim 1, wherein a servo apparatus (210) of the second shifting element (B) is placed immediately proximate a transmission housing wall (GW) which forms an outer wall of the transmission housing (GG).

17. The multi-stage automatic transmission according to claim 1, wherein a servo apparatus (210) of the second shifting element (B) activates disks (200) of the second shifting element (B) axially in a direction of the first planetary gear set (RS1).

18. The multi-stage automatic transmission according to claim 1, wherein a servo apparatus (210) of the second shifting element (B) is supported on the sun gear (SO1) of the first planetary gear set (RS1) by at least one bearing.

19. The multi-stage automatic transmission according to claim 1, wherein a servo apparatus (210) of the second shifting element (B) is supported on the input drive shaft (AN) by at least one bearing.

20. The multi-stage automatic transmission according to claim 1, wherein at least one of a servo apparatus (310) of the third shifting element (C) and a servo apparatus (410) of the fourth shifting element (D) are integrated in a transmission-housing affixed housing wall (GW) which forms an outside wall of the transmission housing (GG).

* * * * *